US012490826B2

(12) United States Patent
Jungnickel

(10) Patent No.: US 12,490,826 B2
(45) Date of Patent: Dec. 9, 2025

(54) STORAGE CASE FOR STORING A POWER-DRIVEN PERSONAL CARE IMPLEMENT AND PERSONAL CARE KIT

(71) Applicant: The Gillette Company LLC, Boston, MA (US)

(72) Inventor: Uwe Jungnickel, Königstein (DE)

(73) Assignee: The Gillette Company LLC, Boston, MA (US)

( * ) Notice: Subject to any disclaimer, the term of this patent is extended or adjusted under 35 U.S.C. 154(b) by 341 days.

(21) Appl. No.: 17/890,551

(22) Filed: Aug. 18, 2022

(65) Prior Publication Data

US 2023/0058266 A1 Feb. 23, 2023

(30) Foreign Application Priority Data

Aug. 20, 2021 (EP) .................................... 21192362

(51) Int. Cl.
*A46B 17/04* (2006.01)
*A61C 17/22* (2006.01)

(52) U.S. Cl.
CPC .............. *A46B 17/04* (2013.01); *A61C 17/22* (2013.01)

(58) Field of Classification Search
CPC .......... A45D 44/18; A61B 17/04; A61C 17/22
See application file for complete search history.

(56) References Cited

U.S. PATENT DOCUMENTS 2,247,003 A * 6/1941 Smith .................... A45D 44/18 401/191
2,509,339 A * 5/1950 Fair ........................ A45D 44/18 401/262
2,601,244 A * 6/1952 Boulicault ............. A45D 44/18 132/309

(Continued)

FOREIGN PATENT DOCUMENTS

CN 203139160 U 8/2013
CN 304263200 S 9/2017

(Continued)

OTHER PUBLICATIONS

All Office Actions; U.S. Appl. No. 29/850,267, filed Aug. 18, 2022.

(Continued)

*Primary Examiner* — Nicholas D Lucchesi
(74) *Attorney, Agent, or Firm* — Jay A. Krebs

(57) ABSTRACT

A storage case for storing a power-driven personal care implement includes a primary cavity and a primary cover, preferably movably connected to the primary cavity. The primary cavity and the primary cover define a primary compartment configured to store the power-driven personal care implement therein. The primary cover is configured to set the primary compartment in an open position or a closed position. The storage case includes a secondary cavity and a secondary cover, preferably movably connected to the secondary cavity. The secondary cavity and the secondary cover define a secondary compartment separate from the primary compartment. The secondary cover is configured to set the (Continued)

secondary compartment in an open position or a closed position. The secondary compartment is configured to store a power source electrically unconnected to any electrical conductors.

18 Claims, 15 Drawing Sheets

(56) References Cited

U.S. PATENT DOCUMENTS

| | | | | | |
|---|---|---|---|---|---|
| 2,656,843 | A * | 10/1953 | Boulicault | A45D 44/18 401/269 |
| 3,287,076 | A * | 11/1966 | Spofford | A47K 1/09 206/362.1 |
| 3,884,635 | A * | 5/1975 | Sloan | A45D 44/18 206/209 |
| 5,004,106 | A | 4/1991 | Blumstock et al. | |
| 5,487,877 | A * | 1/1996 | Choi | A47K 5/00 250/455.11 |
| 6,220,253 | B1 * | 4/2001 | Wright | A45C 11/008 206/581 |
| 6,253,773 | B1 * | 7/2001 | Ingemann | A45D 44/18 132/308 |
| 6,454,089 | B1 * | 9/2002 | Pease | A45C 3/004 206/289 |
| 6,484,732 | B1 * | 11/2002 | Simister | A45D 44/18 206/581 |
| D481,532 | S | 11/2003 | Sayers et al. | |
| 7,228,863 | B2 * | 6/2007 | Dumler | A45D 33/006 132/294 |
| D682,538 | S | 5/2013 | Rollo | |
| D731,178 | S | 6/2015 | Gorouvein et al. | |
| D829,168 | S | 9/2018 | Massee et al. | |
| D909,746 | S | 2/2021 | Albay et al. | |
| D946,263 | S | 3/2022 | Albay | |
| D964,746 | S | 9/2022 | Gao | |
| 2004/0065572 | A1 * | 4/2004 | Anthony | A61B 50/3001 206/366 |
| 2005/0268935 | A1 * | 12/2005 | Hoffecker | A46B 17/04 132/309 |
| 2007/0251034 | A1 * | 11/2007 | Meressa | A61C 17/225 15/23 |
| 2008/0169251 | A1 * | 7/2008 | Smith | A47B 67/00 211/90.01 |
| 2011/0100865 | A1 * | 5/2011 | Brink | A61C 19/02 206/581 |
| 2011/0215097 | A1 * | 9/2011 | Archie, Jr. | A45C 11/20 29/428 |
| 2011/0315572 | A1 * | 12/2011 | Vu | A61C 19/02 206/216 |
| 2012/0222697 | A1 * | 9/2012 | Schumann | A47K 1/09 132/308 |
| 2014/0150189 | A1 * | 6/2014 | Shigeno | A61C 17/224 206/362.2 |
| 2015/0203269 | A1 | 7/2015 | Semer | |
| 2016/0317268 | A1 * | 11/2016 | Dietzel | A61C 19/02 |
| 2017/0099945 | A1 * | 4/2017 | Meads | A47G 1/00 |
| 2017/0105825 | A1 * | 4/2017 | Okai | A45D 44/18 |
| 2020/0078151 | A1 | 3/2020 | Plotka | |

FOREIGN PATENT DOCUMENTS

| | | | |
|---|---|---|---|
| CN | 208372172 | U | 1/2019 |
| CN | 108042817 | B | 5/2020 |
| CN | 111358164 | A | 7/2020 |
| CN | 211433449 | U | 9/2020 |
| JP | 2019099251 | A | 6/2019 |
| WO | 2014097225 | A1 | 6/2014 |
| WO | 2020051434 | A1 | 3/2020 |

OTHER PUBLICATIONS

Extended EP Search Report and Written Opinion for 21192362.8 dated Feb. 15, 2022, 07 pages.
PCT Search Report and Written Opinion for PCT/US2022/040313 dated Sep. 15, 2022, 12 pages.
Cosmos Pack of 2 Plastic Travel Case, Retrieved from internet URL: https://a.co/ d/12f3YCV , Aug. 15, 2024, 06 Pages.
Fowecelt 2 Pack Electric Toothbrush Travel Case for Oral-B Pro, Retrieved from internet URL: https://a.co/d/gDCz6VM, Aug. 15, 2024, 07 Pages.
Hovesty 2 Pcs Electric Toothbrush Travel Case, Retrieved from internet URL: https://a.co/d/a77mRFi ,Aug. 15, 2024, 08 Pages.
Oral B Replacement Charging Travel Case for type 3758, 107, 108, 109, 1010 Tooth, Retrieved from internet URL: https://www.ebay.com/itm/133952174101 . Aug. 15, 2024, 03 Pages.

* cited by examiner

STORAGE CASE FOR STORING A POWER-DRIVEN PERSONAL CARE IMPLEMENT AND PERSONAL CARE KIT

FIELD OF THE INVENTION

The present disclosure is concerned with a storage case for storing a power-driven personal care implement, the storage case comprising a primary cavity, a primary cover, a secondary cavity, and a secondary cover. The primary cavity and the primary cover define a primary compartment, while the secondary cavity and the secondary cover define a secondary compartment separate from the primary compartment. The present disclosure is further concerned with a personal care kit comprising such storage case.

BACKGROUND OF THE INVENTION

Storage cases for storing power-driven personal care implements, like power-driven toothbrushes, power-driven shavers, and power-driven epilators, are well known in the art. Generally, power-driven personal care implements require a power source, such as a battery, to operate. Storage cases known in the art are suitable to store power-driven personal care implements. However, such storage cases are not adapted to store the power source independent from the power-driven personal care implement.

Storage cases known in the art may comprise a battery that is utilized for various functions other than powering the power-driven personal care implements. For example, the battery may be utilized to power an ultra-violet (UV) light for disinfecting the power-driven personal care implement stored in the storage case. In other words, the battery housed in such storage cases is generally not connected to the power-driven personal care implement itself to power the implement.

Usually, the power source powering the power-driven personal care implement is stored and carried separately from the storage cases by a user during travel. However, separately storing and carrying the power source may cause inconvenience to the user during travel. In addition, the power source stored separately from the storage cases may get misplaced or lost during travel, causing further inconvenience.

In some instances, the user may also need to carry spare power sources for the power-driven personal care implements during travel. Storing the spare power sources separately, or procuring the spare power sources during travel, may be inconvenient and impractical for the user.

Storing the power source together with the power-driven personal care implement in one compartment may potentially result in a short-circuit of the power source, for example, due to the presence of contaminants within the compartment, such as moisture and/or any other electrically conductive material. For instance, water along with any additional material, such as toothpaste, could be introduced into the compartment if the power-driven personal care implement is not sufficiently cleaned and dried after use. Water may come into contact with the power source and act as an electrical conductor, thereby short circuiting positive and negative terminals or poles of the power source. This may result in discharge of the power source, and in some cases, may pose electrical hazard to the user.

Therefore, there is a need for a storage case that is suitable for storing a power-driven personal care implement along with a power source, so that that the power source does not suffer any damage or short-circuit during storage, for example, due to contact with any contaminants.

It is an object of the present disclosure to provide a storage case for storing a power-driven personal care implement which overcomes at least one of the above-mentioned drawbacks. It is also an object of the present disclosure to provide a personal care kit comprising such storage case.

SUMMARY OF THE INVENTION

In accordance with one aspect, a storage case for storing a power-driven personal care implement is provided, the storage case comprising a primary cavity, a primary cover, preferably movably connected to the primary cavity, the primary cavity and the primary cover defining a primary compartment configured to store the power-driven personal care implement therein, the primary cover being configured to set the primary compartment in an open position or a closed position, the storage case further comprising a secondary cavity, and a secondary cover, preferably movably connected to the secondary cavity, the secondary cavity and the secondary cover defining a secondary compartment separate from the primary compartment, the secondary cover being configured to set the secondary compartment in an open position or a closed position, wherein the secondary compartment is configured to store a power source electrically unconnected to any electrical conductors. In accordance with one aspect, a personal care kit is provided that comprises such storage case.

BRIEF DESCRIPTION OF THE DRAWINGS

The invention is described in more detail below with reference to various embodiments and figures, wherein.

DETAILED DESCRIPTION OF THE INVENTION

Figure 1B:
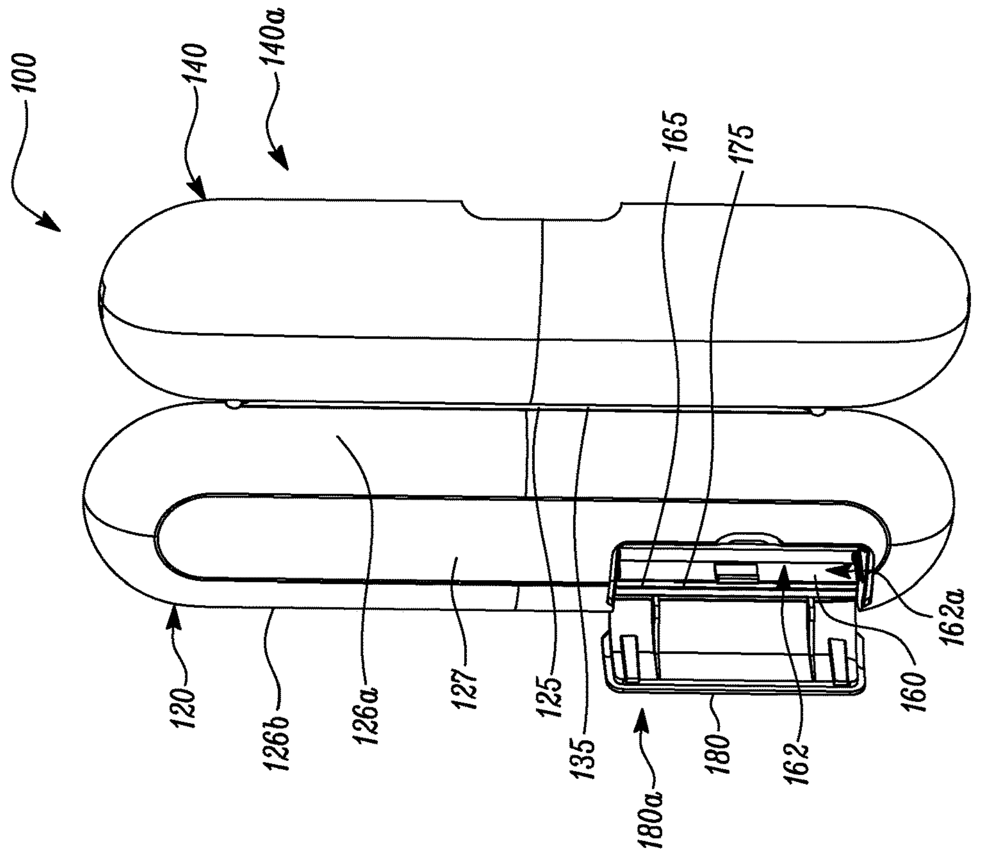
FIG. 1B shows a schematic rear perspective view of the storage case of FIG. 1A.

A storage case for a power-driven personal care implement according to the present disclosure comprises a primary cavity and a primary cover. The primary cavity and the primary cover define a primary compartment configured to store the power-driven personal care implement therein. In the context of this disclosure, the term "power-driven personal care implement" refers to any implement which can be utilized for the purposes of personal care and is powered by a power source, such as a battery. Examples of the power-driven personal care implement include power-driven toothbrushes, power-driven razors, power-driven epilators, and the like.

The primary cover is configured to set the primary compartment in an open or a closed position. In other words, the primary cover may be movable to an open cover position to set the primary compartment in the open position, i.e., a state of the primary compartment in which the power-driven personal care implement may be accessed by a user. Therefore, in the open position, the power-driven personal care implement can be removed from the primary compartment. The primary cover may further be movable to a closed cover position to set the primary compartment in the closed position, i.e., a state of the primary compartment in which the power-driven personal care implement may not be accessible by a user. In the closed position, the power-driven personal care implement may be securely stored within the primary compartment and cannot be removed or ejected from the primary compartment even if the storage case undergoes any movement (e.g., jerks or rotations).

The primary cover may be configured to set the primary compartment in the open position or the closed position by any suitable mechanism, such as a snap-fit. Specifically, the primary cover and the primary cavity may comprise complementary primary interlocking features, such that the primary cover may be attachable to and detachable from the primary cavity. In some examples, the primary cover may be fully detachable from the primary cavity after the complementary primary interlocking features are unlocked or unlatched. However, the primary cover is preferably movably connected to the primary cavity. In other words, the primary cover is preferably configured to move relative to the primary cavity, while staying mechanically connected to the primary cavity. Therefore, the primary cover may not get misplaced or lost during travel.

In some cases, the primary cover is movably connected to the primary cavity in addition to the complementary primary interlocking features. The complementary primary interlocking features may detachably secure the primary cover to the primary cavity in the closed position. Moreover, the primary cover can be moved relative to the primary cavity after unlocking or unlatching the complementary primary interlocking features. For example, after unlocking the complementary primary interlocking features, the primary cover can be moved to the open cover position to set the primary compartment in the open position. The relative movement between the primary cavity and the primary cover may be linear, curvilinear, rotational, or a combination thereof.

The storage case further comprises a secondary cavity and a secondary cover. The secondary cavity and the secondary cover define a secondary compartment separate from the primary compartment. The secondary compartment is configured to store a power source electrically unconnected to any electrical conductors. In other words, the secondary compartment is free of any electrical conductors. In the context of this disclosure, an electrical conductor is defined as any type of object or material allowing flow of electrical current in one or more directions. Further, in the context of this disclosure, the term "power source" refers to any power source which can power the power-driven personal care implement, such as a battery. The power source may be rechargeable or non-rechargeable. Examples of the power source include AA batteries, AAA batteries, 9-volt batteries, and the like.

Therefore, the secondary compartment may store the power source in an electrically-isolated and detached state. The power source, when stored in the secondary compartment, does not supply power to any electrical devices (e.g., a UV light for disinfecting the power-driven personal care implement). In other words, no power may be drawn from the power source when stored in the secondary compartment. Therefore, the power source may substantially retain its charge level. Further, the power source can be removed from the secondary compartment for use with the power-driven personal care implement. In addition, the secondary compartment may be used to store spare power sources (i.e., extra power sources) during travel.

The secondary cover is configured to set the secondary compartment in an open or a closed position. In other words, the secondary cover may be movable to an open cover position to set the secondary compartment in open position, i.e., in a state in which the power source may be accessible by the user. Therefore, in the open position, the power source can be removed from the secondary compartment. The secondary cover may further be movable to a closed cover position to set the secondary compartment in closed position, i.e., in a state in which the power source may not be accessible by the user. In the closed position, the power source can be securely stored within the secondary compartment and cannot be removed or ejected from the secondary compartment even if the storage case undergoes any movement (e.g., jerks or rotations).

The secondary cover may be configured to set the secondary compartment in the open or closed position by any suitable mechanism, such as a snap-fit. Specifically, the secondary cover and the secondary cavity may comprise complementary secondary interlocking features, so that the secondary cover is attachable to and detachable from the secondary cavity. In some examples, the secondary cover may be fully detachable from the secondary cavity after the complementary secondary interlocking features are unlocked or unlatched. However, the secondary cover is preferably movably connected to the secondary cavity. In other words, the secondary cover is preferably configured to move relative to the secondary cavity, while staying mechanically connected to the secondary cavity. Therefore, the secondary cover may not get misplaced or lost during travel.

In some cases, the secondary cover is movably connected to the secondary cavity in addition to the complementary secondary interlocking features. The complementary secondary interlocking features may detachably secure the secondary cover to the secondary cavity in the closed position. Moreover, the secondary cover can be moved relative to the secondary cavity after unlocking or unlatching the complementary secondary interlocking features. For example, after unlocking the complementary secondary interlocking features, the secondary cover can be moved to the open cover position to set the secondary compartment in the open position. The relative movement between the secondary cavity and the secondary cover may be linear, curvilinear, rotational, or a combination thereof.

The secondary compartment may be separated from the primary compartment in a substantially watertight manner. In other words, a wall of the secondary cavity may seal the secondary compartment from the primary compartment in order to prevent a flow of liquid from the primary compartment to the secondary compartment. This may prevent a short-circuit of the power source stored in the secondary compartment. Such short-circuit can otherwise occur due to ingress of liquid from the primary compartment in which the power-driven personal care implement is stored. Separating the primary and the secondary compartment in a watertight manner may prevent contaminants, such as water and toothpaste, entering the secondary compartment from the primary compartment. In one example, the secondary cavity may comprise one or more walls made of an impermeable material, such as polypropylene, to separate the secondary compartment from the primary compartment in a substantially watertight manner. Other examples of impermeable materials include polyethylene, ethylene-vinyl acetate, polyamide, acrylonitrile butadiene styrene, polyoxymethylene, acrylonitrile styrene acrylate, and the like.

The secondary cavity may extend at least partially into the primary compartment to enable a compact design. The storage case may consequently be easy to carry and store.

The primary cavity may comprise a first side wall and a second side wall disposed opposite to the first side wall. Further, the secondary cavity may comprise an edge wall disposed distal to the first side wall and proximal to the second side wall. The primary cover may be movably coupled to the primary cavity at the first side wall, and the secondary cover may be movably coupled to the secondary cavity at the edge wall. In other words, the primary cover and the secondary cover may be movably connected to the storage case opposite to each other. Therefore, movements of the primary cover and the secondary cover may not interfere with each other. The user can easily open the primary cover without accidentally opening the secondary cover, and vice versa.

The primary cavity may further define an opening communicating with the secondary compartment. In some examples, the opening may be defined at the second side wall. The opening may allow moving the secondary cover from the closed cover position to the open cover position to access the secondary compartment without moving the primary cover. In other words, the primary cover and the secondary cover may be movable independently of each other for accessing the respective primary and secondary compartments. Thus, the user may access the primary compartment or the secondary compartment independently of each other, as desired.

The primary cavity may comprise an open front side and a back wall disposed opposite to the open front side. Further, the primary cover may cover the open front side in the closed position, and the secondary cover may be disposed adjacent to the back wall in the closed position of the secondary compartment. Such a configuration may further prevent accidental movement of the primary cover when the secondary cover is moved, and vice versa. Further, the back wall may define a recess to facilitate moving the secondary cover from the closed cover position to the open cover position. Since the primary cover and the secondary cover open from opposing sides (i.e., front and back sides) of the storage case, any accidental entry of liquid or any contaminants from the primary compartment to the secondary compartment may be further prevented when both the primary cover and the secondary cover are opened simultaneously.

The secondary cavity may further comprise a main wall and one or more retaining members extending from the main wall. The one or more retaining members may be configured to removably secure the power source within the secondary compartment. The one or more retaining members may be configured to engage and removably secure the power source within the secondary compartment. In some instances, the one or more retaining members may substantially prevent movement of the power source when stored within the secondary compartment.

The storage case may further comprise a primary hinge joint pivotally connecting the primary cover to the primary cavity, and/or a secondary hinge joint pivotally connecting the secondary cover to the secondary cavity. The primary hinge joint and the secondary hinge joint may be any suitable type of hinge joints, such as barrel hinges, flag hinges, self-closing hinges, living hinges, and the like. The primary hinge joint is preferably a primary flexural hinge and the secondary hinge joint is preferably a secondary flexural hinge. The primary flexural hinge may allow the primary cavity and the primary cover to be integrally formed as one component. Further, the secondary flexural hinge may allow the secondary cavity and the secondary cover to be integrally formed as one component. Advantageously, the primary flexural hinge and the secondary flexural hinge may allow the primary cavity, the primary cover, the secondary cavity, and the secondary cover to be integrally formed as a single component. Thus, the storage case may be easy to manufacture at relatively low costs, and may not require major modifications in existing manufacturing lines.

The storage case may further comprise a primary latch mechanism configured to releasably secure the primary cover to the primary cavity, and/or a secondary latch mechanism configured to releasably secure the secondary cover to the secondary cavity. The primary latch mechanism and the secondary latch mechanism may be of any suitable type, such as a clasp, a snap-fit latch, and the like.

The primary latch mechanism may correspond to the complementary primary interlocking features that releasably retain the primary cover to the primary cavity in the closed position. The primary latch mechanism may be provided in addition to the movable connection between the primary cover and the primary cavity. The primary latch mechanism may prevent accidental movement of the primary cover relative to the primary cavity. Specifically, the primary cover may not move from the closed cover position to the open cover position unless the primary latch mechanism is manually unlocked. This may ensure that the power-driven personal care implement stored in the primary compartment may not get misplaced or lost during travel.

Furthermore, the secondary latch mechanism may correspond to the complementary secondary interlocking features that releasably retain the secondary cover to the secondary cavity in the closed position. The secondary latch mechanism may be provided in addition to the movable connection between the secondary cover and the secondary cavity. The secondary latch mechanism may prevent accidental movement of the secondary cover relative to the secondary cavity.

Specifically, the secondary cover may not move from the closed cover position to the open cover position unless the secondary latch mechanism is manually unlocked. This may ensure that the power source stored in the secondary compartment may not get misplaced or lost during travel.

The primary cavity, the primary cover, the secondary cavity, and the secondary cover may be unitarily molded in one molding step. The primary cavity, the primary cover, the secondary cavity, and the secondary cover may be integrally formed as one component, e.g. unitarily molded by injection molding, blow molding, compression molding, transfer molding, or any other suitable molding process. Therefore, the storage case may be easy to manufacture at relatively low costs, and may not require major modifications in existing manufacturing lines.

The storage case may be made from a material selected from the following list: polypropylene, polyethylene, ethylene-vinyl acetate, polyamide, acrylonitrile butadiene styrene, polyoxymethylene, acrylonitrile styrene acrylate, and any combinations thereof. Preferably, the storage case may be unitarily made from polypropylene. The materials recited in the list above may be suitable for molding and may be economically feasible. Furthermore, the materials recited in the list above may have the desirable properties, such as impermeability to water, moldability, non-toxicity etc., for making the storage case.

The primary compartment may have a maximum length extension extending along a longitudinal axis of the primary compartment and a maximum width extension extending perpendicular to the longitudinal axis of the primary compartment. Further, the secondary compartment may have a maximum length extension extending along a longitudinal axis of the secondary compartment and a maximum width extension extending perpendicular to the longitudinal axis of the secondary compartment. The maximum length extension of the primary compartment may be greater than the maximum length extension of the secondary compartment by a factor of at least two, and/or the maximum width extension of the primary compartment may be greater than the maximum width extension of the secondary compartment by a factor of at least two. In some examples, the maximum length extension of the primary compartment may be greater than the maximum length extension of the secondary compartment by a factor of at least two, at least three, or at least four. Further, the maximum width extension of the primary compartment may be greater than the maximum width extension of the secondary compartment by a factor of at least two, at least three, or at least four.

A ratio between the maximum length extension of the primary compartment and the maximum length extension of the secondary compartment may be advantageously chosen based on a relative length difference between one or more components of the power-driven personal care implement and the power source. Similarly, a ratio between the maximum width extension of the primary compartment and the maximum width extension of the secondary compartment may be advantageously chosen based on a relative width difference between the one or more components of the power-driven personal care implement and the power source. Generally, the one or more components of the power-driven personal care implement may have greater length and/or width relative to the power source. Therefore, such a relative configuration of the primary compartment and the secondary compartment may allow the storage case to have a compact design by reducing or eliminating any redundant space within the storage case.

Moreover, a personal care kit according to the present disclosure comprises the storage case and a power-driven personal care implement, preferably a power-driven oral care implement, and more preferably a power-driven toothbrush. The power-driven personal care implement may be stored in the primary compartment of the storage case.

The power-driven oral care implement may comprise a handle and a head. The head may be repeatedly attachable to and detachable from the handle. Alternatively, head may be permanently connected to the handle. In some instances, the head and the handle may be integrally formed as a unitary component.

The personal care kit may further comprise a power source removably stored within the secondary compartment. The power source may be at least one battery. The power source may alternatively be a plurality of batteries.

Since the secondary compartment is separate from the primary compartment, the power source may be fluidically and electrically isolated from the power-driven personal care implement when stored within the secondary compartment. In case the power-driven personal care implement is a power-driven toothbrush, the specific configuration of the storage case may prevent entry of contaminants adhering to the toothbrush, such as water and/or toothpaste, from the primary into the secondary compartment. Thus, the storage case of the present disclosure may protect the power source from coming into contact with such contaminants, thereby preventing any damage and/or short-circuit of the power source while being stored within the secondary compartment.

The following is a non-limiting discussion of example embodiments of storage cases, personal care kits and parts thereof in accordance with the present disclosure, where reference to the Figures is made.

Figure 1A:
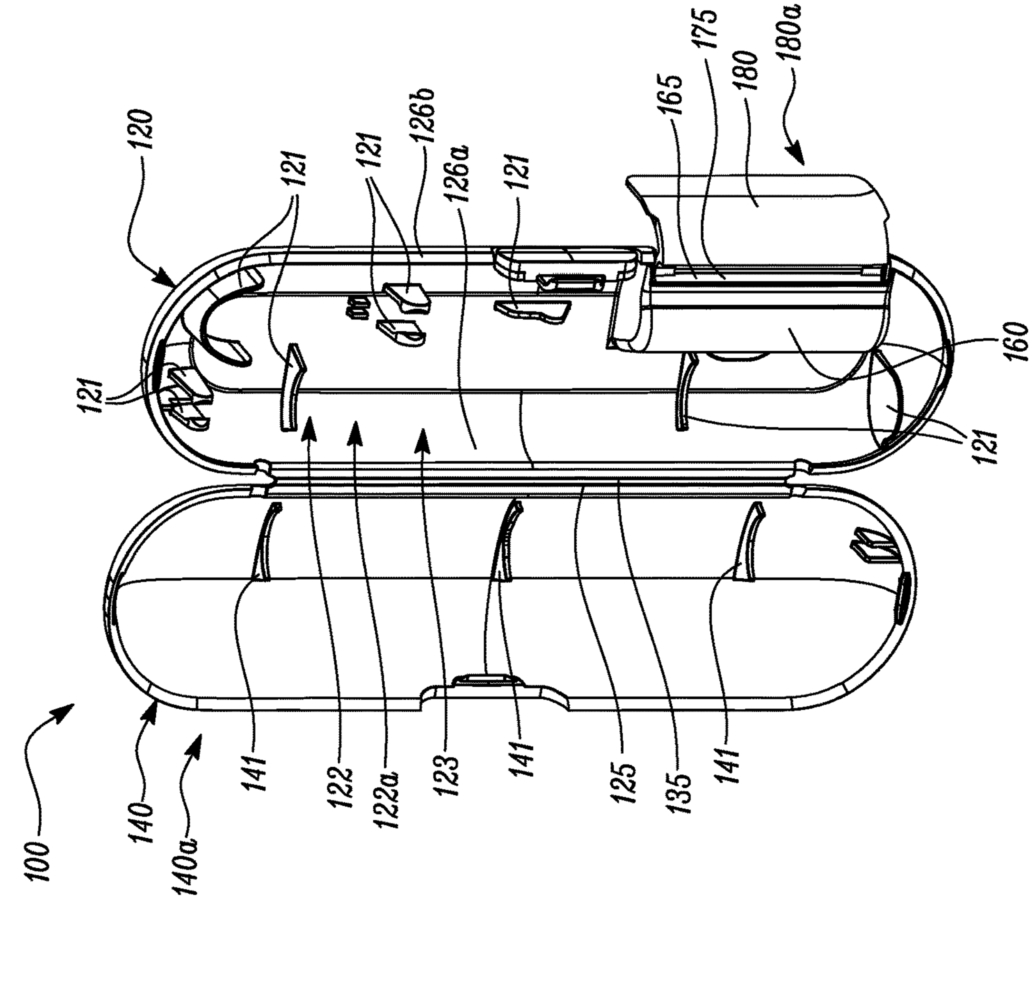
FIG. 1A shows a schematic front perspective view of a storage case according to the present disclosure.

FIGS. 1A and 1B show a schematic front perspective view and a schematic rear perspective view, respectively, of a storage case 100 for storing a power-driven personal care implement. The storage case 100 may be suitable for storing the power-driven personal care implement while being carried by a user during travel.

The power-driven personal care implement may be any implement that requires power to operate, such as a power-driven toothbrush, a power-driven razor, a power-driven epilator, and the like. The power-driven personal care implement may receive power from any suitable power source. In some examples, the power-driven personal care implement may be a battery-driven implement. That is, the power-driven personal care implement may receive power from one or a plurality of batteries, such as non-rechargeable primary batteries, and rechargeable secondary batteries. Examples of the plurality of batteries include AA batteries, AAA batteries, 9-volt batteries, and the like.

The storage case 100 comprises a primary cavity 120 and a primary cover 140. The primary cavity 120 and the primary cover 140 define a primary compartment 122 configured to store the power-driven personal care implement therein. The primary cavity 120 and the primary cover 140 may have any suitable shape and dimensions to store the power-driven personal care implement.

The primary cover 140 is configured to set the primary compartment 122 in an open position 122*a* or a closed position 122*b* (shown in FIGS. 1A, 1B, 2A and 2B). The open position 122*a* of the primary compartment 122 may refer to a state of the primary compartment 122 in which the power-driven personal care implement is accessible. Accordingly, the primary cover 140 may be movable to an open cover position 140*a* to set the primary compartment 122 in the open position 122*a*.

Further, the closed position 122*b* (shown in FIGS. 2A and 2B) of the primary compartment 122 may refer to a state of the primary compartment 122 in which the power-driven personal care implement may not be removable from the primary compartment 122 by the user. In other words, the user may not be able to access the power-driven personal care implement stored in the primary compartment 122. Accordingly, the primary cover 140 may be movable to a closed cover position 140*b* (shown in FIGS. 2A and 2B) to set the primary compartment 122 in the closed position 122*b*. Thus, the primary cover 140 may be movable between the open cover position 140*a* and the closed cover position 140*b* to set the primary compartment 122 in the open position 122*a* and the closed position 122*b*, respectively.

The primary cover 140 may be configured to set the primary compartment 122 in the open position 122*a* or the closed position 122*b* (shown in FIGS. 1A, 1B, 2A and 2B) by any suitable mechanism. In one example, the primary cover 140 may be attachable to and detachable from the primary cavity 120 by a snap-fit to set the primary compartment 122 in the open position 122*a* and the closed position 122*b*, respectively. Accordingly, the primary cover 140 and the primary cavity 120 may comprise complementary primary interlocking features such that the primary cover 140 may be attachable to and detachable from the primary cavity 120.

In some examples, the primary cover 140 may be fully detachable from the primary cavity 120 after the complementary primary interlocking features are unlocked or unlatched. However, the primary cover 140 is preferably movably connected to the primary cavity 120, as illustrated in FIGS. 1A and 1B. That is, the primary cover 140 may be configured to move relative to the primary cavity 120, while staying mechanically connected to the primary cavity 120. In other words, the primary cavity 120 and the primary cover 140 may be movable relative to each other while remaining connected to each other. Therefore, the primary cover 140 may not get misplaced or lost during travel.

Specifically, the storage case 100 illustrated in FIGS. 1A and 1B comprises a primary hinge joint 125 pivotally connecting the primary cover 140 to the primary cavity 120. The primary hinge joint 125 may be any suitable type of hinge joint, such as a barrel hinge, a flag hinge, a self-closing hinge, a living hinge, and the like. However, the primary hinge joint 125 is preferably a primary flexural hinge 135. Making use of a primary flexural hinge 135 may reduce manufacturing costs of the storage case 100, as the primary cover 140 and the primary cavity 120 can be manufactured in one molding step.

The primary cavity 120 further comprises an open front side 123 and a back wall 127 disposed opposite to the open front side 123. The user may access the power-driven personal care implement stored in the primary compartment 122 from the open front side 123. Further, the primary cover 140 can cover the open front side 123 in the closed position 122*b* (shown in FIGS. 2A and 2B). In other words, the primary cover 140 covers the open front side 123 in the closed cover position 140*b* (shown in FIGS. 2A and 2B). Thus, the user may not be able to access the power-driven personal care implement stored in the primary compartment 122 from the open front side 123 when it is in the closed position 122*b*.

The primary cavity 120 further comprises a first side wall 126*a* and a second side wall 126*b* disposed opposite to the first side wall 126*a*. The primary cover 140 illustrated in FIGS. 1A and 1B is movably coupled to the primary cavity 120 at the first side wall 126*a*. Specifically, the primary cover 140 is movably coupled to the primary cavity 120 at the first side wall 126*a* by the primary hinge joint 125. More specifically, the primary flexural hinge 135 movably couples the primary cover 140 to the first side wall 126*a* of the primary cavity 120.

Further, the first side wall 126*a* and the second side wall 126*b* are connected to the back wall 127. The back wall 127, the first side wall 126*a*, and the second side wall 126*b* partially define the primary compartment 122. Further, the back wall 127 may be unitarily formed with the first and second side walls 126*a*, 126*b*, thereby forming the primary cavity 120. Moreover, the back wall 127 illustrated in FIGS. 1A and 1B may be substantially planar and generally oval in shape. Alternatively, the back wall 127 may have other suitable shapes, such as rectangular, polygonal, and so forth. In some instances, the back wall 127 may be curved. Further, each of the first side wall 126*a* and the second side wall 126*b* illustrated in FIGS. 1A and 1B may be curved, or, alternatively, substantially planar.

The primary cavity 120 illustrated in FIG. 1A further comprises a plurality of primary cavity retention features 121 extending from primary cavity 120 into the primary compartment 122. Specifically, each of the plurality of primary cavity retention features 121 extends from one or more of the back wall 127, the first side wall 126*a*, and the second side wall 126*b*. The plurality of primary cavity retention features 121 may be configured to removably secure and restrict movement of the power-driven personal care implement when stored in the primary compartment 122.

The plurality of primary cavity retention features 121 may further facilitate placement of the power-driven personal care implement in the primary compartment 122. Moreover, the primary cover 140 illustrated in FIG. 1A further comprises a plurality of primary cover retention features 141. The plurality of primary cover retention features 141 may complement the plurality of primary cavity retention features 121 in removable securement of the power-driven personal care implement in the primary compartment 122 when the primary cover 140 is in the closed cover position 140*b* (shown in FIG. 2A).

The storage case 100 further comprises a secondary cavity 160 and a secondary cover 180. The secondary cavity 160 and the secondary cover 180 define a secondary compartment 162 separate from the primary compartment 122. The secondary compartment 162 is separated from the primary compartment 122 in a substantially watertight manner. In other words, the secondary cavity 160 is sealed from the primary cavity in order to prevent flow of liquid from the primary compartment 122 to the secondary compartment 162. That is, the secondary cavity 160 may have suitable properties and design to separate the secondary compartment 162 from the primary compartment 122 in the substantially watertight manner.

For example, the secondary cavity 160 may comprise one or more walls made from an impermeable material, such as polypropylene. Other examples of impermeable materials include polyethylene, ethylene-vinyl acetate, polyamide, acrylonitrile butadiene styrene, polyoxymethylene, acrylonitrile styrene acrylate, and the like.

The secondary compartment 162 is configured to store a power source electrically unconnected to any electrical conductors. In other words, the secondary compartment 162 is free of any electrical conductors. In the context of this disclosure, an electrical conductor is defined as any type of object or material allowing flow of electrical current in one or more directions. Therefore, when stored in secondary compartment 162, the power source does not supply power to any electrical devices (e.g., a UV light, the power-driven personal care implement, and the like). In other words, no power is drawn from the power source when stored in the secondary compartment 162. As such, the power source may substantially retain its charge level when stored in the secondary compartment 162.

In some examples, the secondary compartment 162 may be configured to store a plurality of power sources, e.g., a plurality of batteries. In some examples, dimensions of the secondary cavity 160 and the secondary cover 180 may depend on the type and number of the power source. In some examples, the power source may be one or more spare batteries, i.e., extra batteries for powering the power-driven personal care implement.

Moreover, the secondary cavity 160 illustrated in FIG. 1A extends at least partially into the primary compartment 122, thereby enabling a compact design. The storage case 100 may consequently be easy to carry and store within a limited space.

Figure 2B:
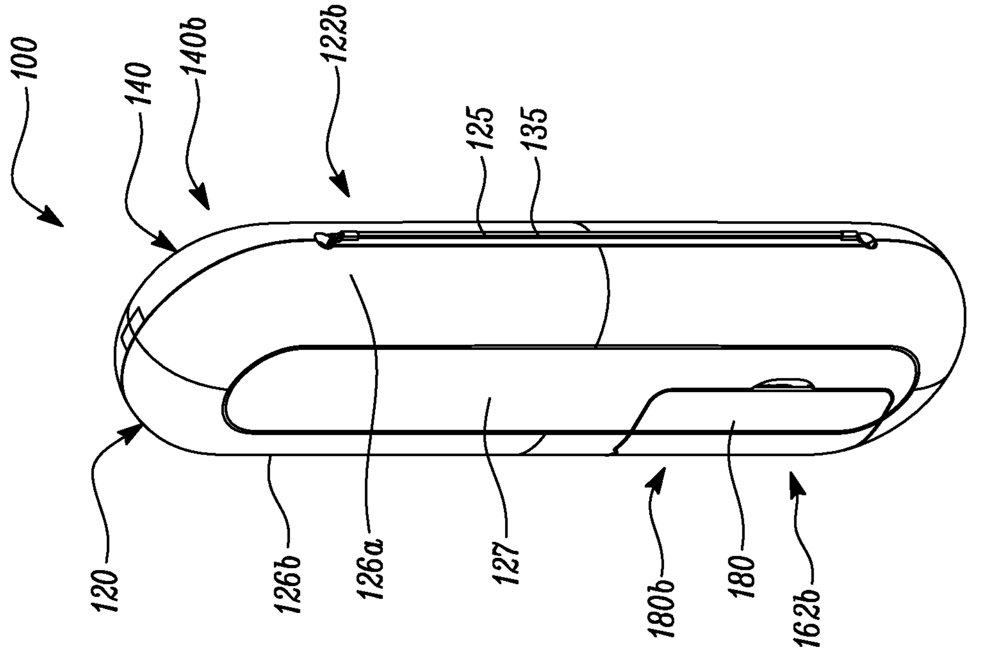
FIG. 2B shows a schematic rear perspective view of the storage case of FIG. 2A.

The secondary cover 180 is configured to set the secondary compartment 162 in an open position 162*a* or a closed position 162*b* (shown in FIGS. 1B and 2B). The open position 162*a* of the secondary compartment 162 may refer to a state of the secondary compartment 162 in which the power source may be accessible by the user. Accordingly, the secondary cover 180 may be movable to an open cover position 180*a* to set the secondary compartment 162 in the open position 162*a*.

Further, the closed position 162*b* (shown in FIG. 2B) of the secondary compartment 162 may refer to a state of the secondary compartment 162 in which the power source may not be removed from the primary compartment 122 by the user. In other words, the user may not be able to access the power source stored in the secondary compartment 162 in the closed position 162*b*. Accordingly, the secondary cover 180 may be movable to a closed cover position 180*b* (shown in FIG. 2B) to set the to set the secondary compartment 162 in the closed position 162*b*. Thus, the secondary cover 180 may be movable between the open cover position 180*a* and the closed cover position 180*b* to set the to set the secondary compartment 162 in the open position 162*a* and the closed position 162*b*, respectively.

The secondary cover 180 may be configured to set the secondary compartment 162 in the open position 162*a* or the closed position 162*b* (shown in FIGS. 1B and 2B) by any suitable mechanism. In one example, the secondary cover 180 may be attachable to and detachable from the secondary cavity 160 by a snap-fit to set the secondary compartment 162 in the open position 162*a* and the closed position 162*b*, respectively. Accordingly, the secondary cover 180 and the secondary cavity 160 may comprise complementary secondary interlocking features such that the secondary cover 180 may be attachable to and detachable from the secondary cavity 160.

In some examples, the secondary cover 180 may be fully detachable from the secondary cavity 160 after the complementary secondary interlocking features have been unlocked or unlatched. However, the secondary cover 180 is preferably movably connected to the secondary cavity 160, as illustrated in FIGS. 1A and 1B. That is, the secondary cover 180 may be configured to move relative to the secondary cavity 160, while staying mechanically connected to the secondary cavity 160. In other words, the secondary cavity 160 and the secondary cover 180 may be movable relative to each other while remaining connected to each other. Therefore, the secondary cover 180 may not get misplaced or lost during travel.

Specifically, the storage case 100 illustrated in FIGS. 1A and 1B comprises a secondary hinge joint 165 pivotally connecting the secondary cover 180 to the secondary cavity 160. The secondary hinge joint 165 may be any suitable type of hinge joint, such as a barrel hinge, a flag hinge, a self-closing hinge, a living hinge, and the like. However, the secondary hinge joint 165 is preferably a secondary flexural hinge 175. Making use of such secondary flexural hinge 175 may reduce manufacturing costs as the secondary cover 180 and the secondary cavity 160 can be manufactured as one piece, thereby reducing associated assembly labor.

Figure 2A:
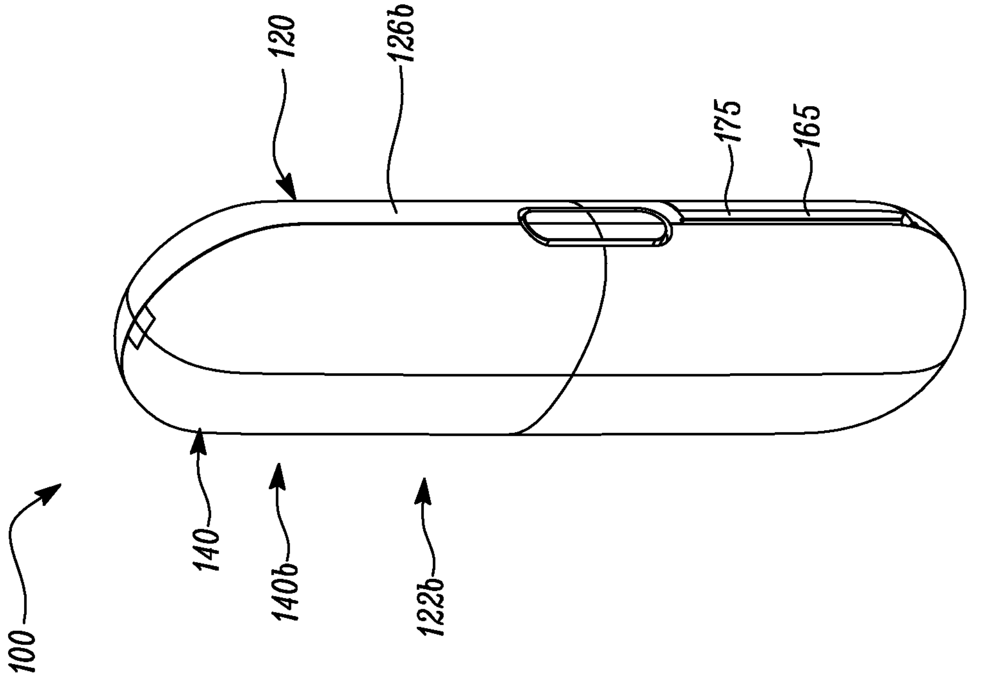
FIG. 2A shows a schematic front perspective view of the storage case of FIG. 1A in another configuration.

FIGS. 2A and 2B show a schematic front perspective view and a schematic rear perspective view, respectively, of the storage case 100 in a closed position.

In FIGS. 2A and 2B, the primary compartment 122 and the secondary compartment 162 are shown in closed positions 122*b*, 162*b* . . . . Accordingly, the primary cover 140 is in the closed cover position 140*b* and the secondary cover 180 is in the closed cover position 140*b*. As discussed above, the primary cover 140 covers the open front side 123 (shown in FIG. 1A) in the closed position 122*b*. Furthermore, the secondary cover 180 is disposed adjacent to the back wall 127 in the closed position 162*b* of the secondary compartment 162.

In other words, the secondary cover 180 is disposed adjacent to the back wall 127 in the closed cover position 180*b*. As shown in FIG. 2B, the secondary cover 180 is substantially flush with the back wall 127 in the closed cover position 180*b*. Therefore, a back side of the storage case 100 may have a smooth shape without any protrusions in the closed cover position 180*b* of the secondary cover 180.

Figure 3A:
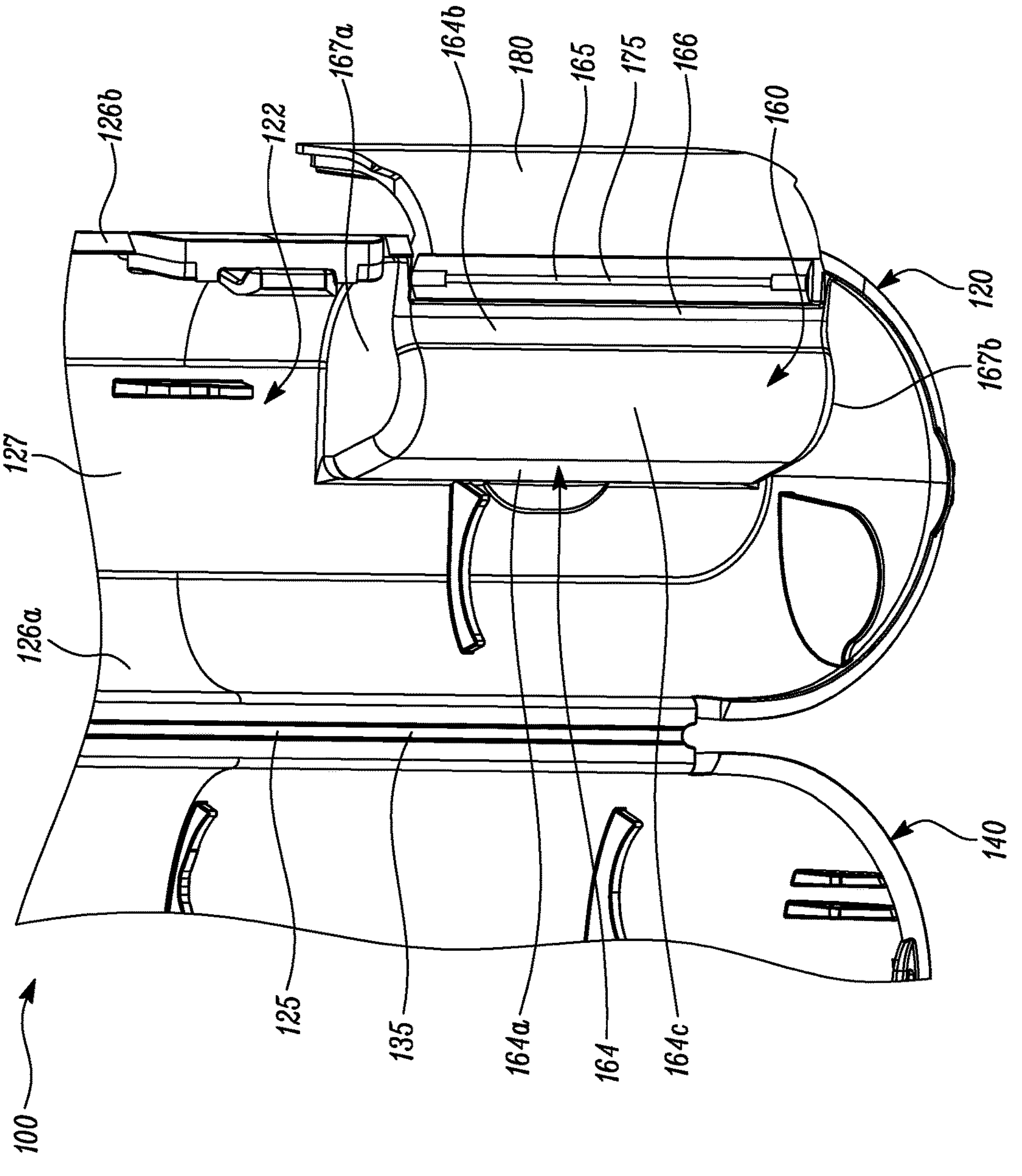
FIG. 3A shows an enlarged schematic top front perspective view of a portion of the storage case.
Figure 3B:
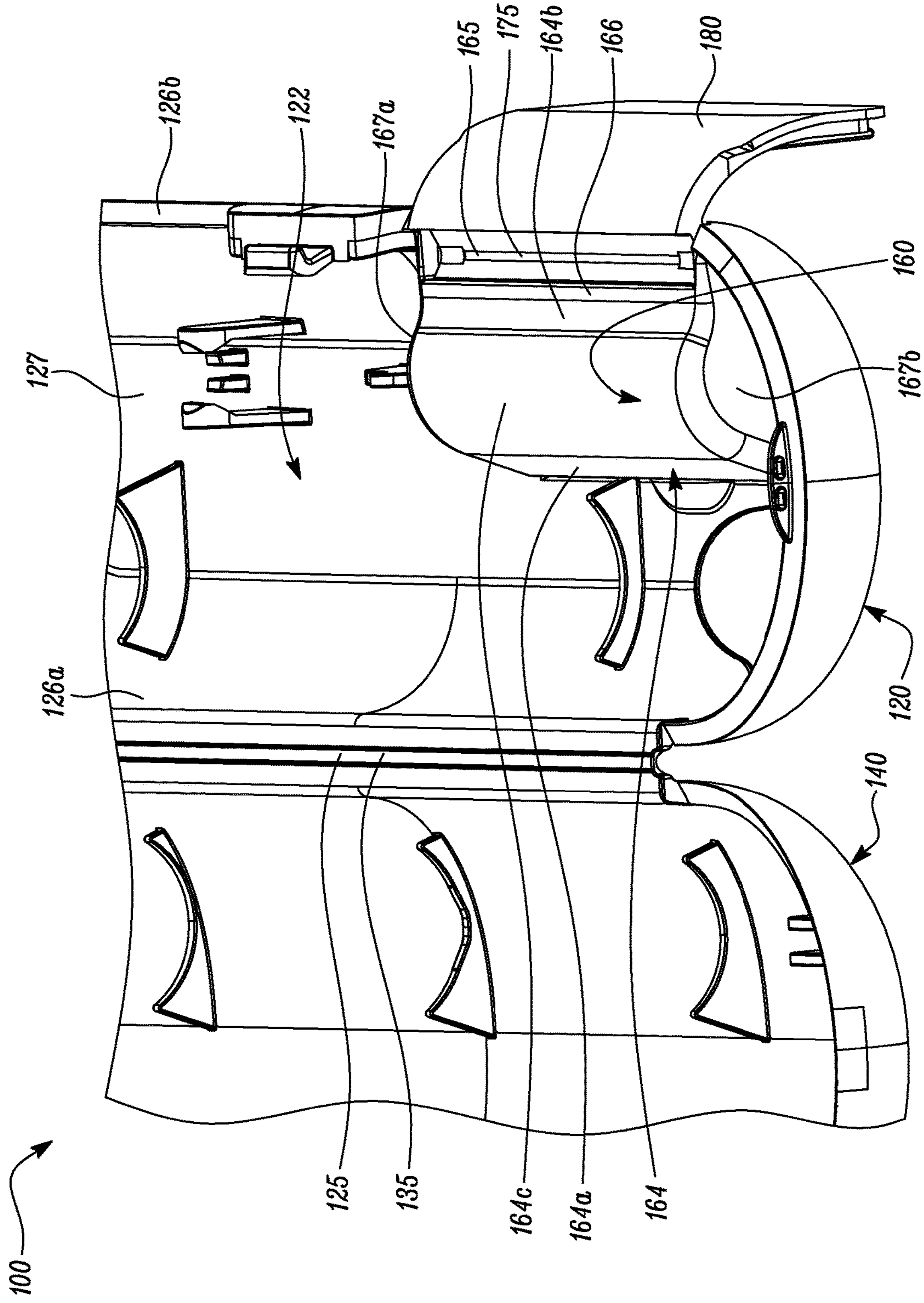
FIG. 3B shows an enlarged schematic bottom front perspective view of a portion of the storage case.

FIG. 3A shows an enlarged schematic top front perspective view of a portion of the storage case 100, and FIG. 3B shows an enlarged schematic bottom front perspective view of a portion of the storage case 100.

The secondary cavity 160 illustrated in FIGS. 3A and 3B comprises an edge wall 166 disposed distal to the first side wall 126*a* and proximal to the second side wall 126*b*. The secondary cover 180 illustrated in FIGS. 3A and 3B is movably coupled to the secondary cavity 160 at the edge wall 166. Specifically, the secondary cover 180 is movably coupled to the secondary cavity 160 at the edge wall 166 by the secondary hinge joint 165. More specifically, the secondary flexural hinge 175 movably couples the secondary cover 180 to the edge wall 166 of the secondary cavity 160.

The secondary cavity 160 further comprises a main wall 164. The main wall 164 extends from the primary cavity 120. Specifically, the main wall 164 illustrated in FIGS. 3A and 3B comprises a first portion 164*a*, a second portion 164*b*, and a third portion 164*c*. The first portion 164*a* is connected to and extends from the primary cavity 120. Specifically, the first portion 164*a* is connected to and extends from of the back wall 127 of the primary cavity 120. The second portion 164*b* is connected to the edge wall 166. The third portion 164*c* connects the first portion 164*a* to the second portion 164*b* and is partially curved.

The secondary cavity 160 illustrated in FIGS. 3A and 3B further comprises a first end wall 167*a* and a second end wall 167*b* disposed opposite to the first end wall 167*a*. The first end wall 167*a* and the second end wall 167*b* are connected to the primary cavity 120, the main wall 164 at each of the first, second, and third portions 164*a*, 164*b*, 164*c*, and the edge wall 166. The first and second end walls 167*a*, 167*b*, the main wall 164, and the edge wall 166 form the secondary cavity 160. Furthermore, the first and second end walls 167*a*, 167*b*, the main wall 164, and the edge wall 166 partially define the secondary compartment 162 (shown in FIG. 1B).

Figure 4A:
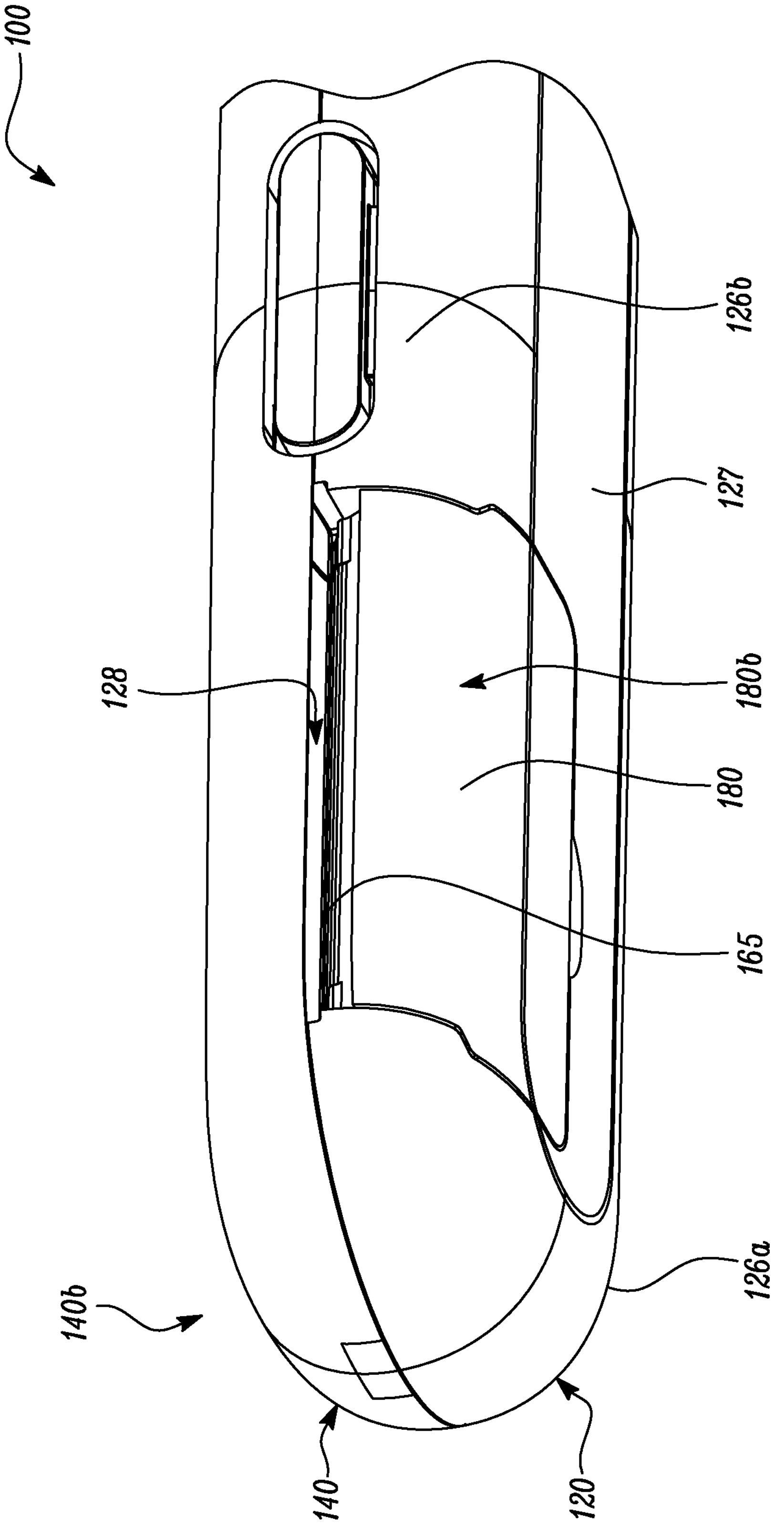
FIG. 4A shows an enlarged schematic side perspective view of a portion of the storage case.
Figure 4B:
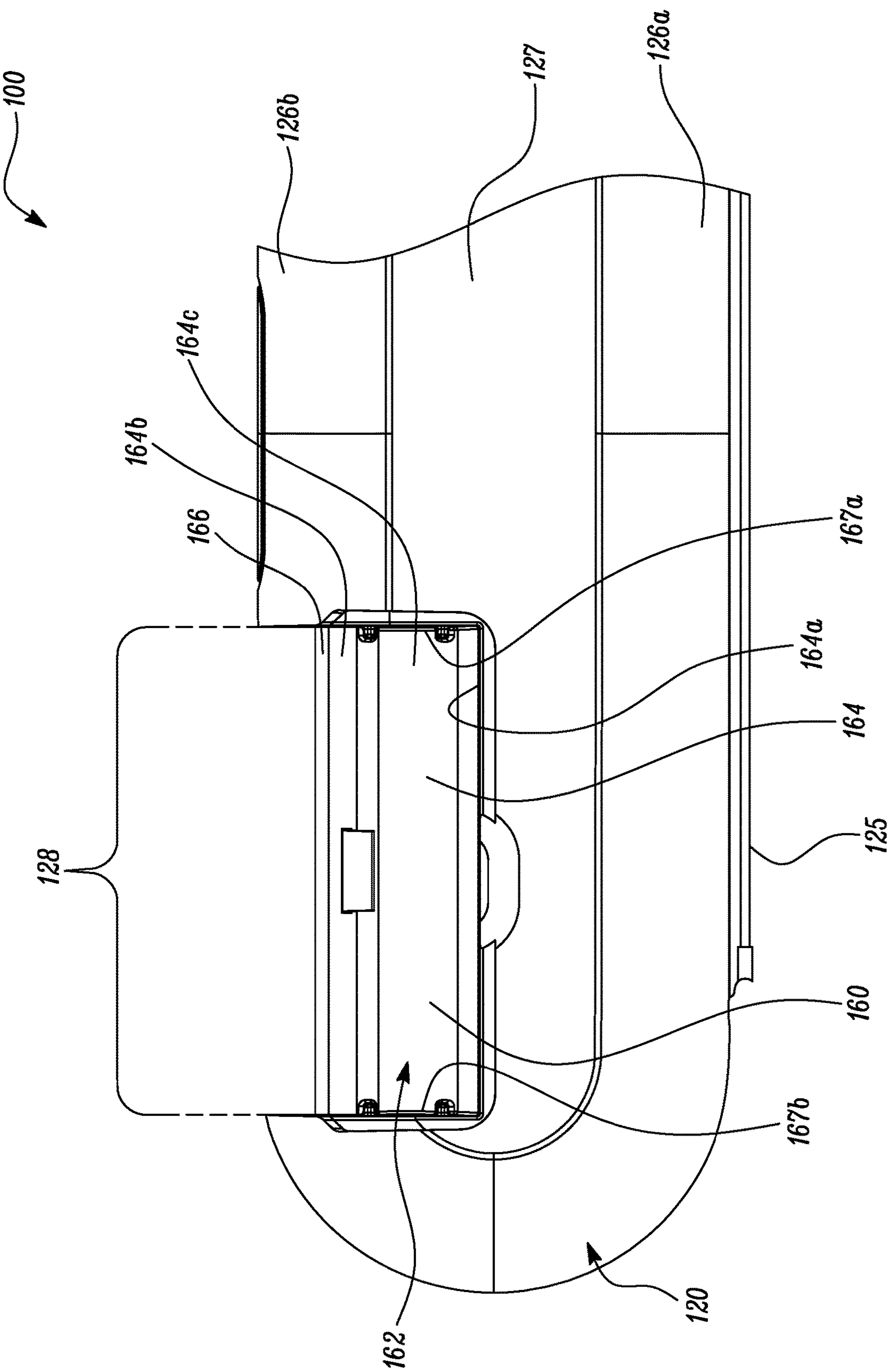
FIG. 4B shows an enlarged schematic rear view of a portion of the storage case.

FIG. 4A shows an enlarged schematic side perspective view of a portion of the storage case 100, and FIG. 4B shows an enlarged schematic rear view of a portion of the storage case 100. The primary cover 140 is in the closed cover position 140*b* in FIGS. 4A and 4B. Further, the secondary cover 180 is in the closed cover position 180*b* in FIG. 4A. The secondary cover 180 and the secondary hinge joint 165 are not shown in FIG. 4B.

The primary cavity 120 illustrated in FIGS. 4A and 4B defines an opening 128 communicating with the secondary compartment 162. Specifically, the opening 128 illustrated in FIGS. 4A and 4B is defined on the second side wall 126*b* of the primary cavity 120. The secondary hinge joint 165 is at least partially disposed in the opening 128. As discussed above, the primary cover 140 is movably coupled to the primary cavity 120 at the first side wall 126*a* and the secondary cover 180 is movably coupled to the secondary cavity 160 at the edge wall 166 proximal to the second side wall 126*b*. Therefore, the opening 128 may allow the secondary cover 180 to move to the open cover position 180*a* (shown in FIG. 3B), while the primary cover 140 is in the closed cover position 140*b*.

The opening 128 may be a cutout in the second side wall 126*b* that allows the secondary cover 180 to be movably coupled to the edge wall 166 and freely move between the open cover position 180*a* and the closed cover position 180*b* without any interference from the primary cover 140. In other words, the primary cover 140 and the secondary cover 180 may be movable independently of each other. Thus, the user may access the primary compartment 122 (shown in FIGS. 3A and 3B) or the secondary compartment 162 independently of each other, as desired.

Figure 5A:
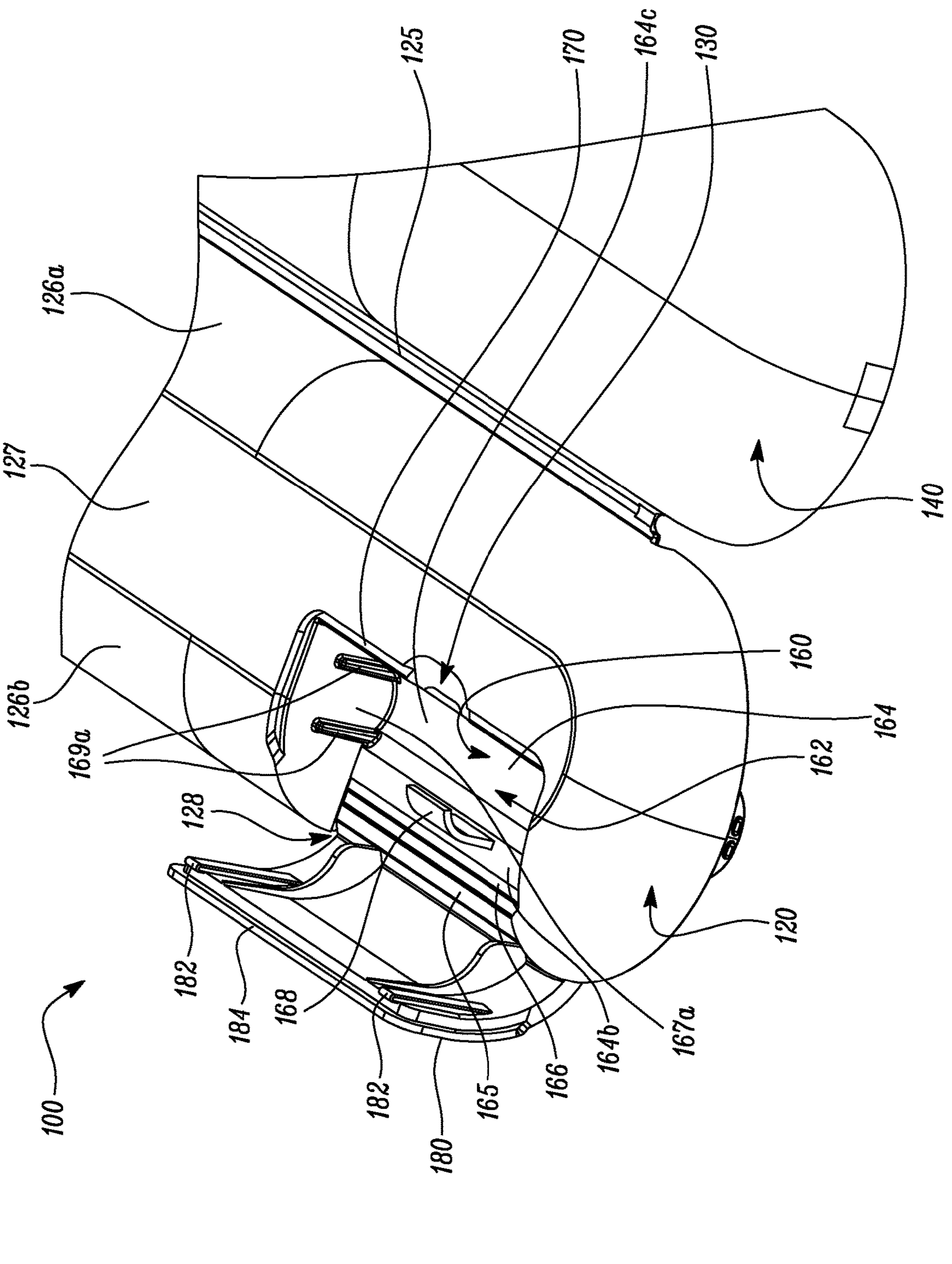
FIG. 5A shows an enlarged schematic bottom rear perspective view of a portion of the storage case.
Figure 5B:
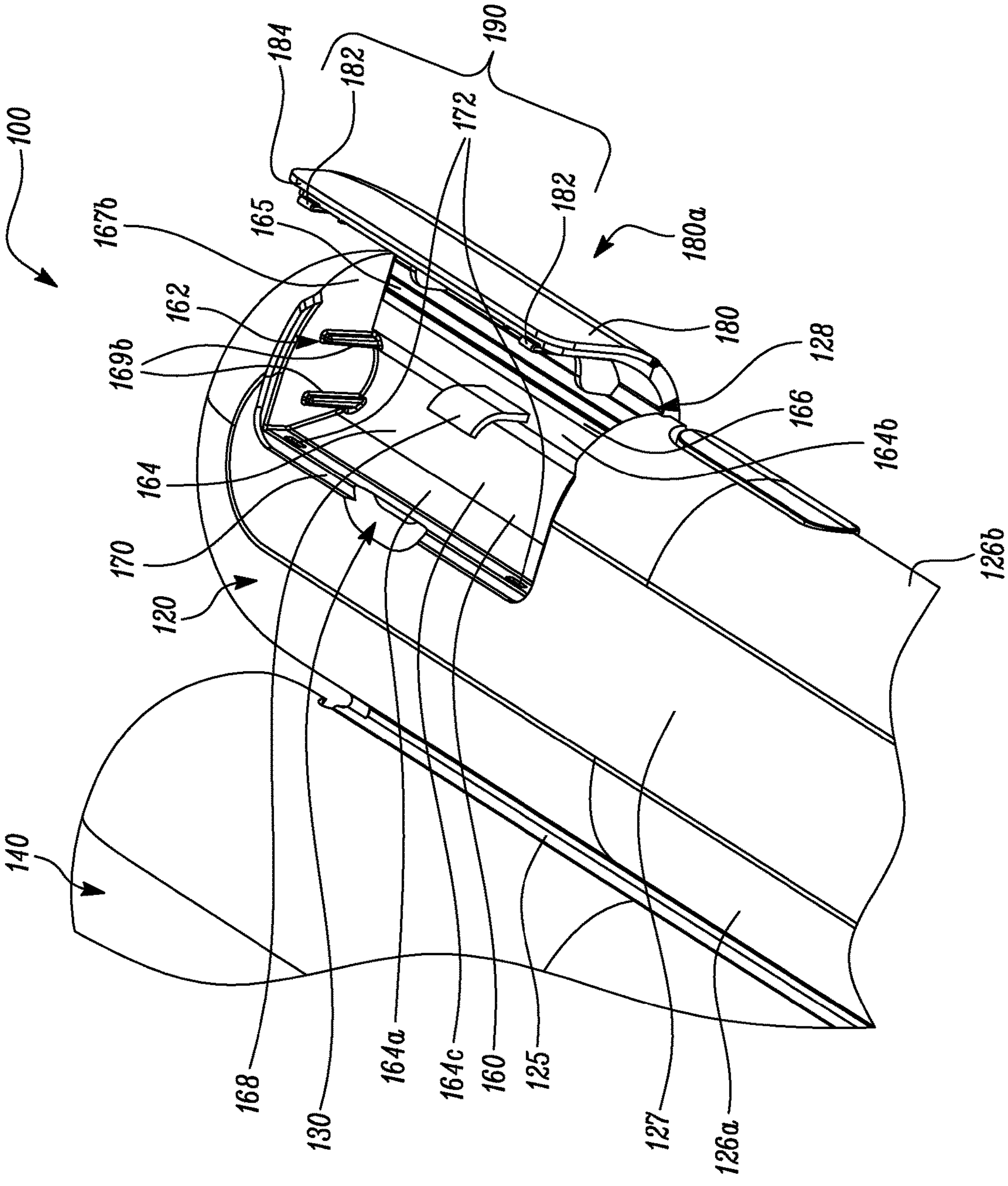
FIG. 5B shows an enlarged schematic top rear perspective view of a portion of the storage case.

FIG. 5A shows an enlarged schematic bottom rear perspective view of a portion of the storage case 100 and FIG. 5B shows an enlarged schematic top rear perspective view of a portion of the storage case 100.

The secondary cavity 160 illustrated in FIGS. 5A and 5B comprises one or more retaining members 168 extending from the main wall 164. Specifically, the one or more retaining members 168 illustrated in FIGS. 5A and 5B extend from the second portion 164*b* of the main wall 164 into the secondary compartment 162 and are curved towards the third portion 164*c* of the main wall 164. The one or more retaining members 168 are configured to removably secure the power source within the secondary compartment 162. In some examples, the one or more retaining members 168 may prevent or substantially reduce movement of the power source when stored within the secondary compartment 162.

The secondary cavity 160 illustrated in FIGS. 5A and 5B further comprises a pair of first protrusions 169*a* and a pair of second protrusions 169*b*. The pair of first protrusions 169*a* is disposed on the first end wall 167*a* and extends into the secondary compartment 162. Moreover, the pair of second protrusions 169*b* is disposed on the second end wall 167*b* and extends into the secondary compartment 162. The pair of first protrusions 169*a* and the pair of second protrusions 169*b* may aid in removably securing the power source within the secondary compartment 162. Moreover, the third portion 164*c* of the main wall 164 being curved may facilitate positioning and removable securement of the power source within the secondary compartment 162.

As illustrated in FIG. 5B, the storage case 100 further comprises a secondary latch mechanism 190 configured to releasably secure the secondary cover 180 to the secondary cavity 160. In other words, the secondary latch mechanism 190 may releasably secure the secondary cover 180 to the secondary cavity 160 in the closed cover position 180*b* (shown in FIG. 4A). The secondary latch mechanism 190 may be of any suitable type, such as a clasp, a snap-fit latch, and the like. Specifically, the secondary latch mechanism 190 illustrated in FIG. 5B comprises one or more slots 172 and one or more extensions 182.

The secondary cavity 160 defines the one or more slots 172 on the first portion 164*a* of the main wall 164. Accordingly, the secondary cover 180 comprises the one or more extensions 182 corresponding to the one or more slots 172 of the secondary cavity 160. The one or more extensions 182 are configured to be at least partially received in the one or more slots 172 in the closed cover position 180*b* to releasably secure the secondary cover 180 to the secondary cavity 160. The secondary latch mechanism 190 illustrated in FIG. 5B is exemplary in nature and the secondary latch mechanism 190 may include any suitable latch mechanism for releasably securing the secondary cover 180 to the secondary cavity 160.

Referring to FIGS. 5A and 5B, the secondary cavity 160 further comprises an engaging surface 170 spaced apart from the back wall 127 of the primary cavity 120. Accordingly, the secondary cover 180 illustrated in FIGS. 5A and 5B comprises a shoulder 184 corresponding to the engaging surface 170 of the secondary cavity 160. In the closed cover position 180*b* (shown in FIG. 4A), the shoulder 184 may abut the engaging surface 170 such that the secondary cover 180 is disposed adjacent to the back wall 127. Moreover, the shoulder 184 and the engaging surface 170 may allow the secondary cover 180 to be flush with the back wall 127 in the closed cover position 180*b*.

The storage case 100 further comprises a recess 130 extending from the back wall 127 to the engaging surface 170 in order to enable the user to move the secondary cover 180 from the closed cover position 180*b* to the open cover position 180*a*. Specifically, the recess 130 may allow the user to grip the shoulder 184 by a finger or fingernail to pry the secondary cover 180 from the closed cover position 180*b* to the open cover position 180*a*.

Figure 6A:
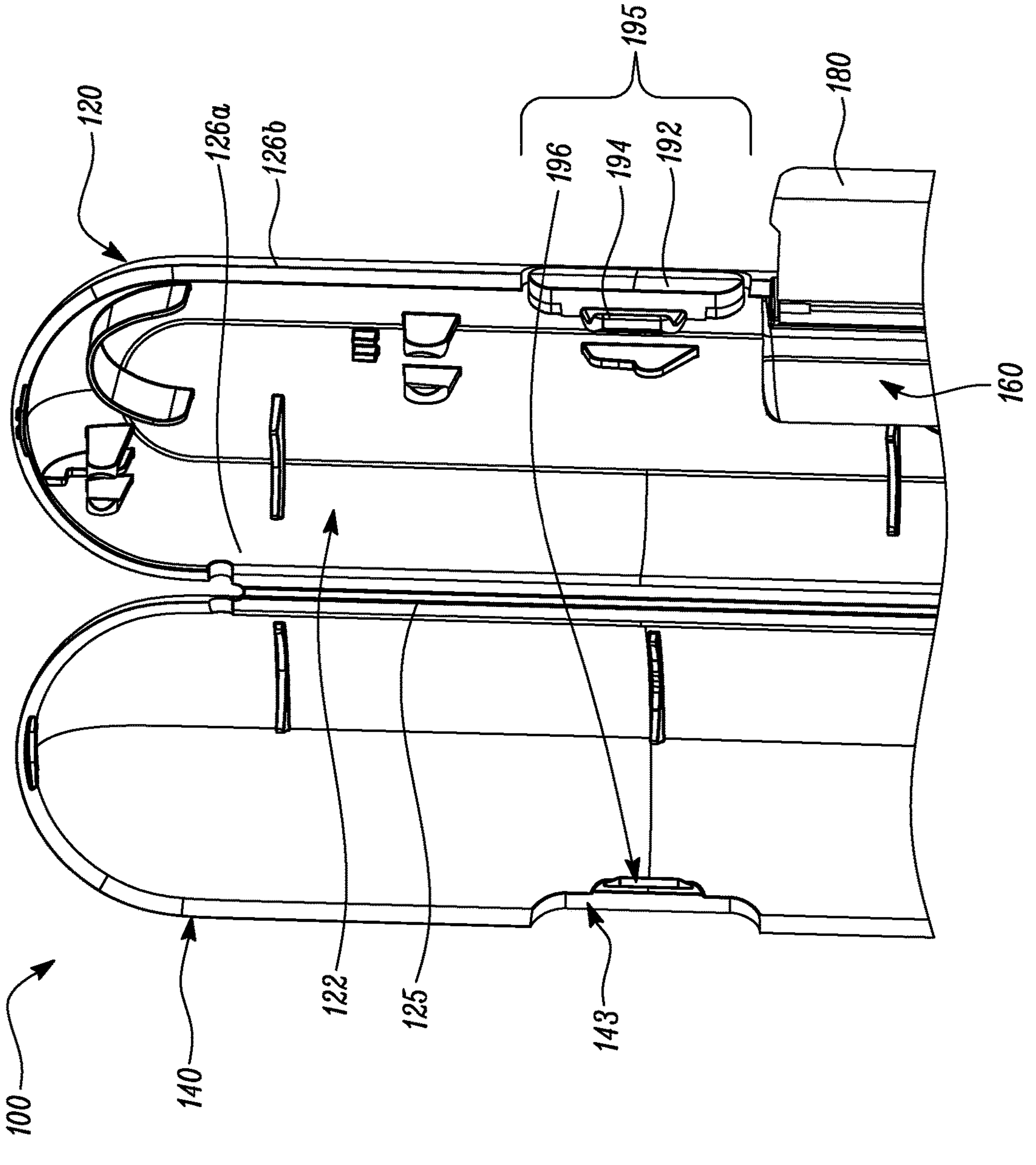
FIG. 6A shows an enlarged schematic front perspective view of a portion of the storage case.
Figure 6B:
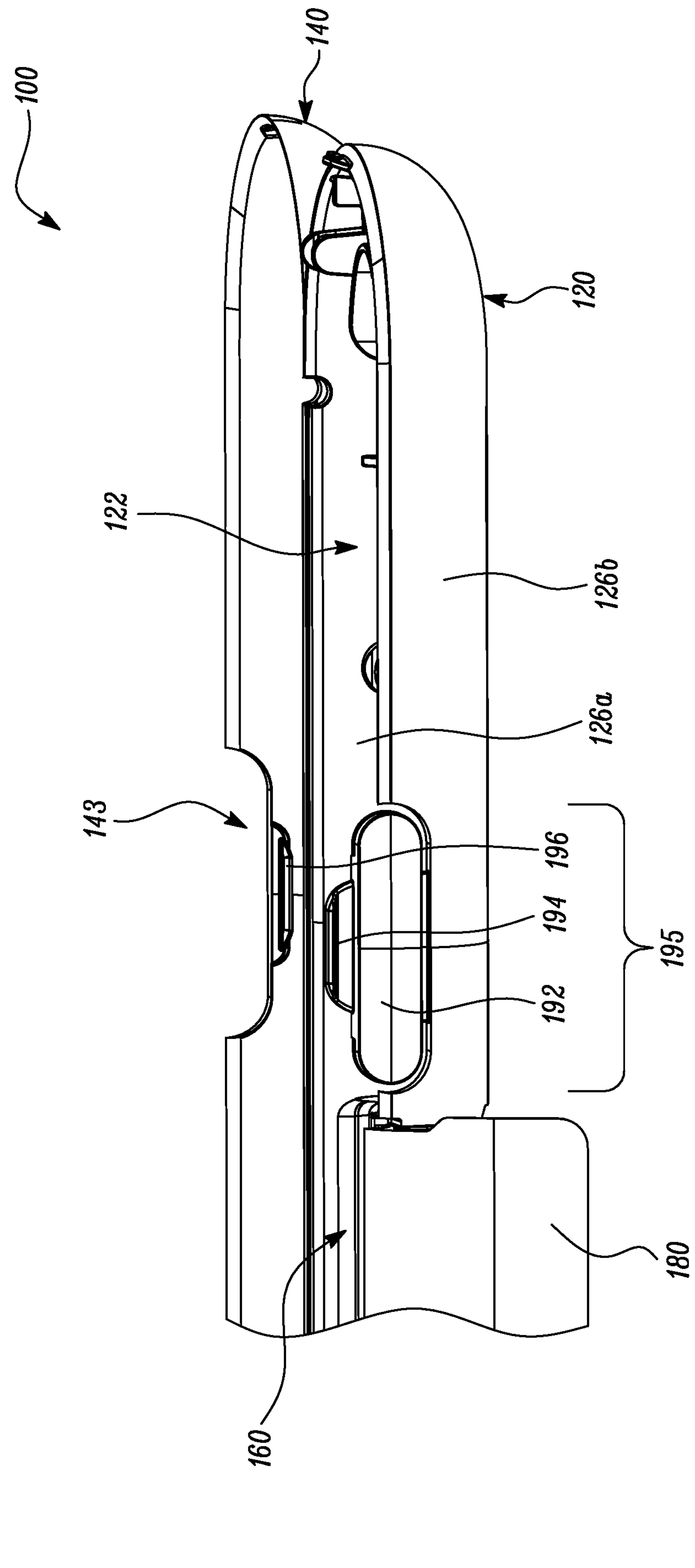
FIG. 6B shows an enlarged schematic side perspective view of a portion of the storage case.

FIG. 6A shows an enlarged schematic front perspective view of a portion of the storage case 100 and FIG. 6B shows an enlarged schematic side perspective view of a portion of the storage case 100.

The storage case 100 illustrated in FIGS. 6A and 6B further comprises a primary latch mechanism 195 configured to releasably secure the primary cover 140 to the primary cavity 120. In other words, the primary latch mechanism 195 may releasably secure the primary cover 140 to the primary cavity 120 in the closed cover position 140*b* (shown in FIG. 2A). The primary latch mechanism 195 may be of any suitable type, such as a clasp, a snap-fit latch, and the like. Specifically, the primary latch mechanism 195 illustrated in FIGS. 6A and 6B comprises a resilient tab 192, an engaging protrusion 194, and a notch 196. The resilient tab 192 is movably connected to the primary cavity 120, specifically at the second side wall 126*b* of the primary cavity 120. Accordingly, the primary cover 140 illustrated in FIGS. 6A and 6B defines a cutout 143 corresponding to the resilient tab 192 of the primary latch mechanism 195.

Further, the engaging protrusion 194 extends from the resilient tab 192. The notch 196 is defined on the primary cover 140 corresponding to the engaging protrusion 194. That is, in the closed cover position 140*b* (shown in FIG. 2A), the engaging protrusion 194 is configured to be at least partially received in the notch 196 to releasably secure the primary cover 140 to the primary cavity 120. To move the primary cover 140 from the closed cover position 140*b* to the open cover position 140*a*, the user may press the resilient tab 192 to remove the engaging protrusion 194 from the notch 196. The primary latch mechanism 195 illustrated in FIGS. 6A and 6B is exemplary in nature and the primary latch mechanism 195 may include any suitable latch mechanism for releasably securing the primary cover 140 to the primary cavity 120.

Figure 7A:
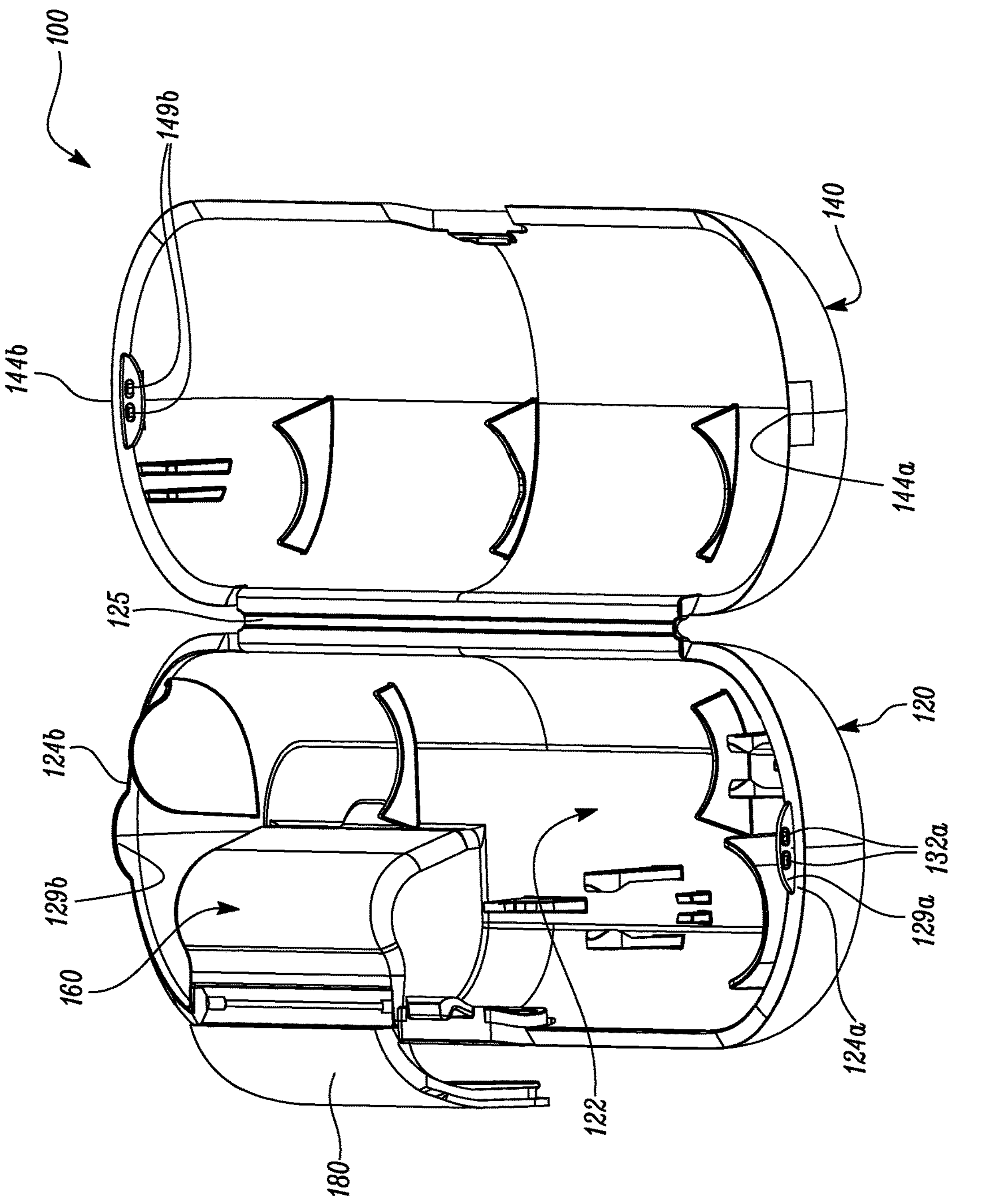
FIG. 7A shows a schematic top perspective view of the storage case.
Figure 7B:
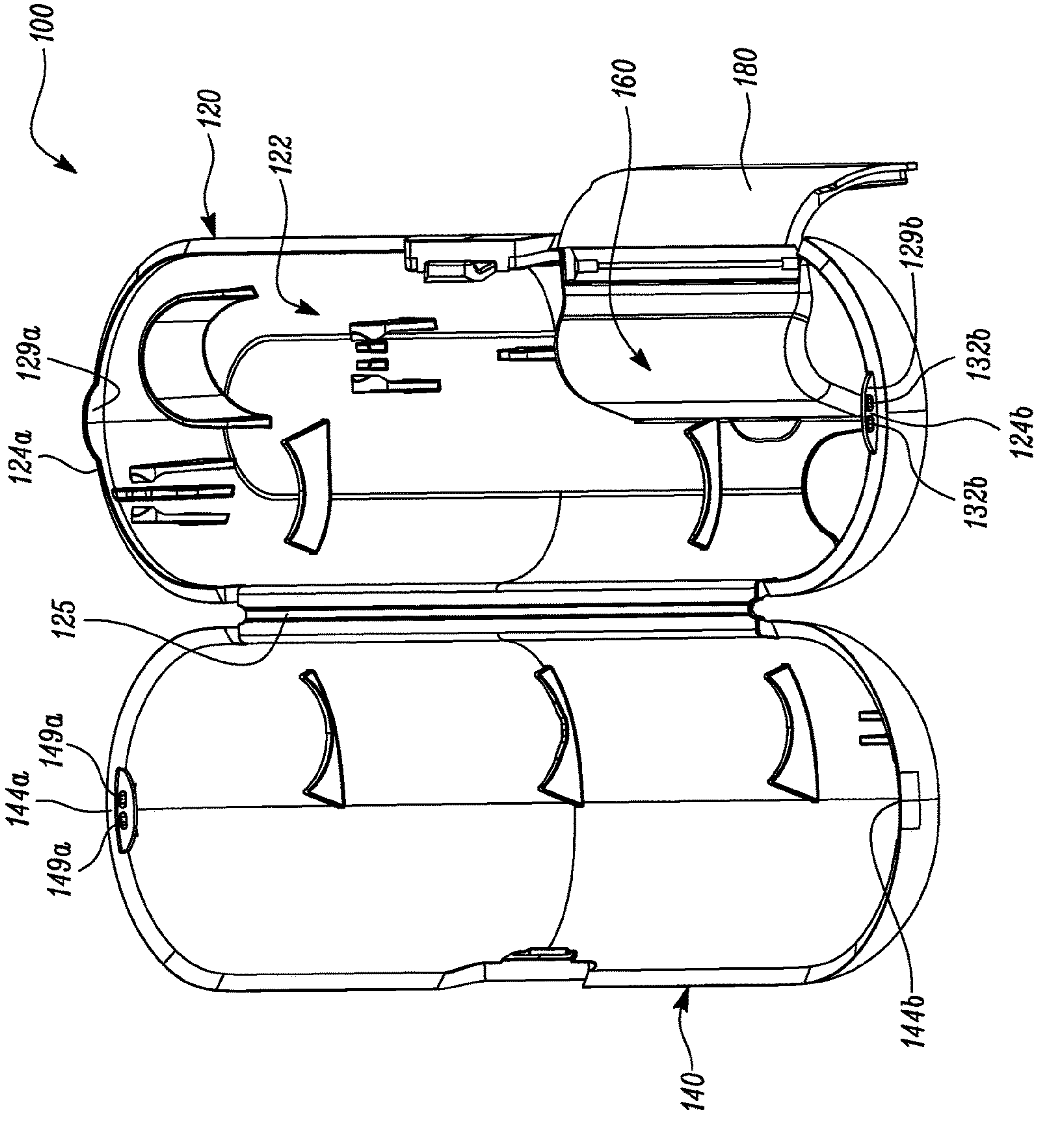
FIG. 7B shows a schematic bottom perspective view of the storage case.

FIGS. 7A and 7B show a schematic top perspective view and a schematic bottom perspective view, respectively, of the storage case 100. The primary cavity 120 illustrated in FIGS. 7A and 7B comprises a first extension 129*a* extending from the primary cavity 120 at a first longitudinal end 124*a* thereof. The first extension 129*a* comprises one or more first projections 132*a* extending from the first extension 129*a* and away from the primary compartment 122. The primary cavity 120 further comprises a second extension 129*b* extending from the primary cavity 120 at a second longitudinal end 124*b* of the primary cavity 120. The second extension 129*b* comprises one or more second projections 132*b* extending from the second extension 129*b* and away from the primary compartment 122. Moreover, the primary cover 140 defines one or more first openings 149*a* at a first longitudinal end 144*a* thereof corresponding to the one or more first projections 132*a*.

Furthermore, the primary cover 140 defines one or more second openings 149*b* at a second longitudinal end 144*b* of the primary cover 140 corresponding to the one or more second projections 132*b*. The one or more first projections 132*a* and the one or more second projections 132*b* are configured to be at least partially received in the one or more first openings 149*a* and the more second openings 149*b*, respectively, in the closed cover position 140*b* (shown in FIGS. 2A and 2B). As such, the one or more first projections 132*a*, the one or more second projections 132*b*, the one or more first openings 149*a*, and the one or more second openings 149*b* may facilitate releasably securing the primary cover 140 to the primary cavity 120.

Figure 8B:
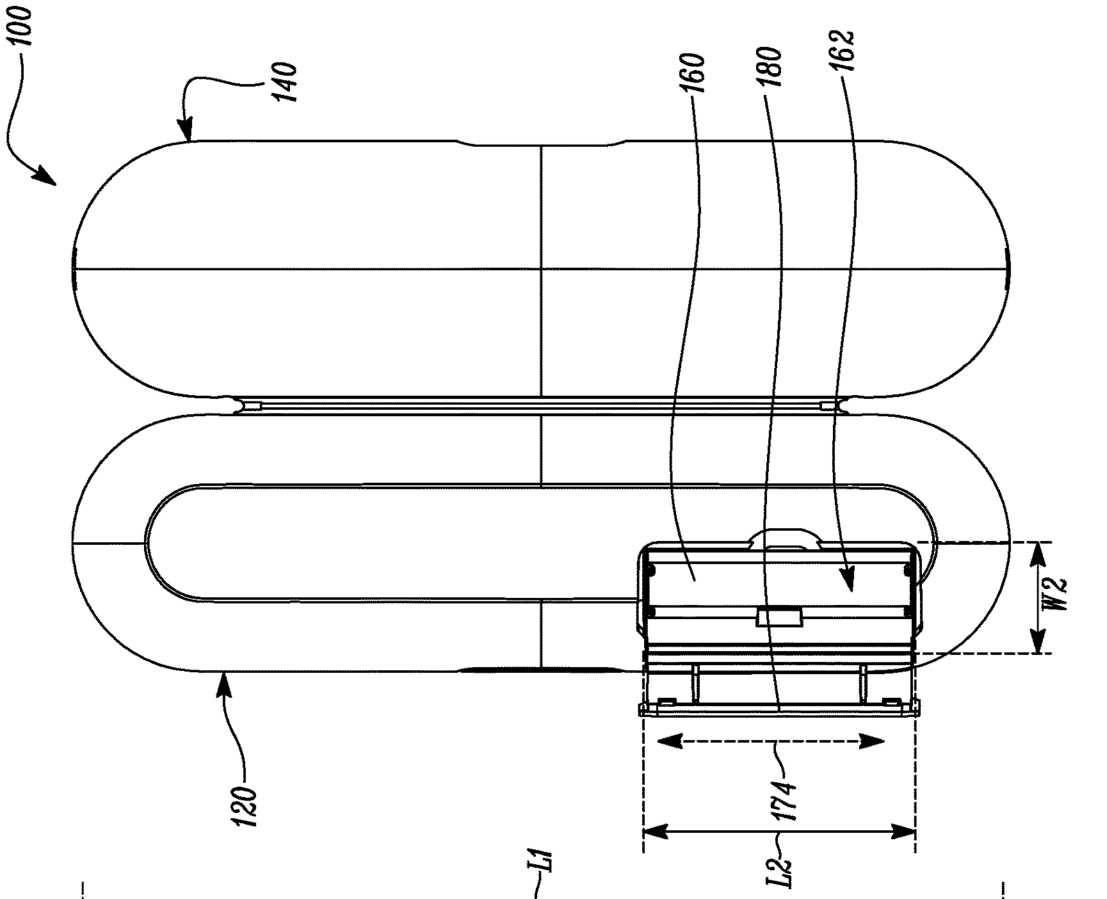
FIG. 8B shows a schematic rear view of the storage case.
Figure 8A:
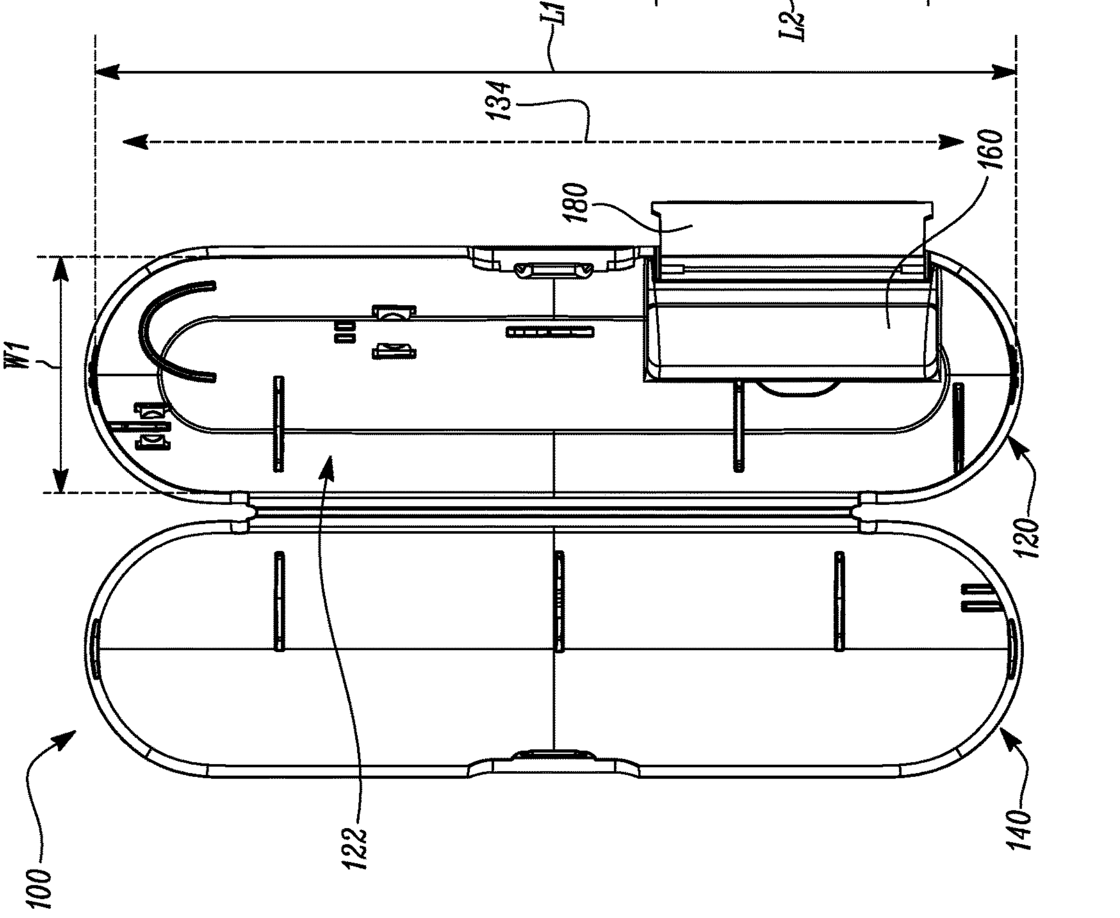
FIG. 8A shows a schematic front view of the storage case.

FIGS. 8A and 8B show a schematic front view and a schematic rear view, respectively, of the storage case 100. The primary compartment 122 has a maximum length extension L1 extending along a longitudinal axis 134 of the primary compartment 122. The primary compartment 122 further has a maximum width extension W1 extending perpendicular to the longitudinal axis 134 of the primary compartment 122. Further, the secondary compartment 162 has a maximum length extension L2 extending along a longitudinal axis 174 of the secondary compartment 162 and a maximum width extension W2 extending perpendicular to the longitudinal axis 174 of the secondary compartment 162.

The maximum length extension L1 and the maximum width extension W1 of the primary compartment 122 may depend on the power-driven personal care implement to be stored in the primary compartment 122. Further, the maximum length extension L2 and the maximum width extension W2 of the secondary compartment 162 may depend on the power source to be stored in the secondary compartment 162. In some examples, the maximum length extension L1 may be about 160 millimeters (mm) to about 170 mm. In some examples, the maximum length extension L1 may be about 164 mm. Furthermore, in some examples, the maximum width extension W1 of the primary compartment 122 may be about from about 40 mm to about 50 mm. In some examples, the maximum width extension W1 of the primary compartment 122 may be about 45 mm.

In some examples, the maximum length extension L1 of the primary compartment 122 is greater than the maximum length extension L2 of the secondary compartment 162 by a factor of at least two. In other words, in some examples, the maximum length extension L1 is at least twice of the maximum length extension L2. Moreover, in some examples, the maximum width extension W1 of the primary compartment 122 is greater than the maximum width extension W2 of the secondary compartment 162 by a factor of at least two. In other words, in some examples, the maximum width extension W1 is at least twice of the maximum width extension W2.

Furthermore, in some examples, the storage case 100 is made from a material selected from the following list: polypropylene, polyethylene, ethylene-vinyl acetate, polyamide, acrylonitrile butadiene styrene, polyoxymethylene, acrylonitrile styrene acrylate, and any combinations thereof. Preferably, the storage case 100 is unitarily made from polypropylene. The materials recited in the list above may be suitable for molding and may be economically feasible. Furthermore, the materials recited in the list above may have desirable properties, such as, impermeability to water, moldability, non-toxicity etc., for making the storage case 100.

Thus, in some examples, the primary cavity 120, the primary cover 140, the secondary cavity 160, and the secondary cover 180 are unitarily molded in one molding step. The primary cavity 120, the primary cover 140, the secondary cavity 160, and the secondary cover 180 may be unitarily molded by injection molding, blow molding, compression molding, transfer molding, or any other suitable molding process. Therefore, the storage case 100 may be easy and economical to manufacture, and may not require major modifications in existing manufacturing lines to manufacture. The storage case 100 may be made from recycled and/or recyclable and/or biodegradable material.

Figure 9B:
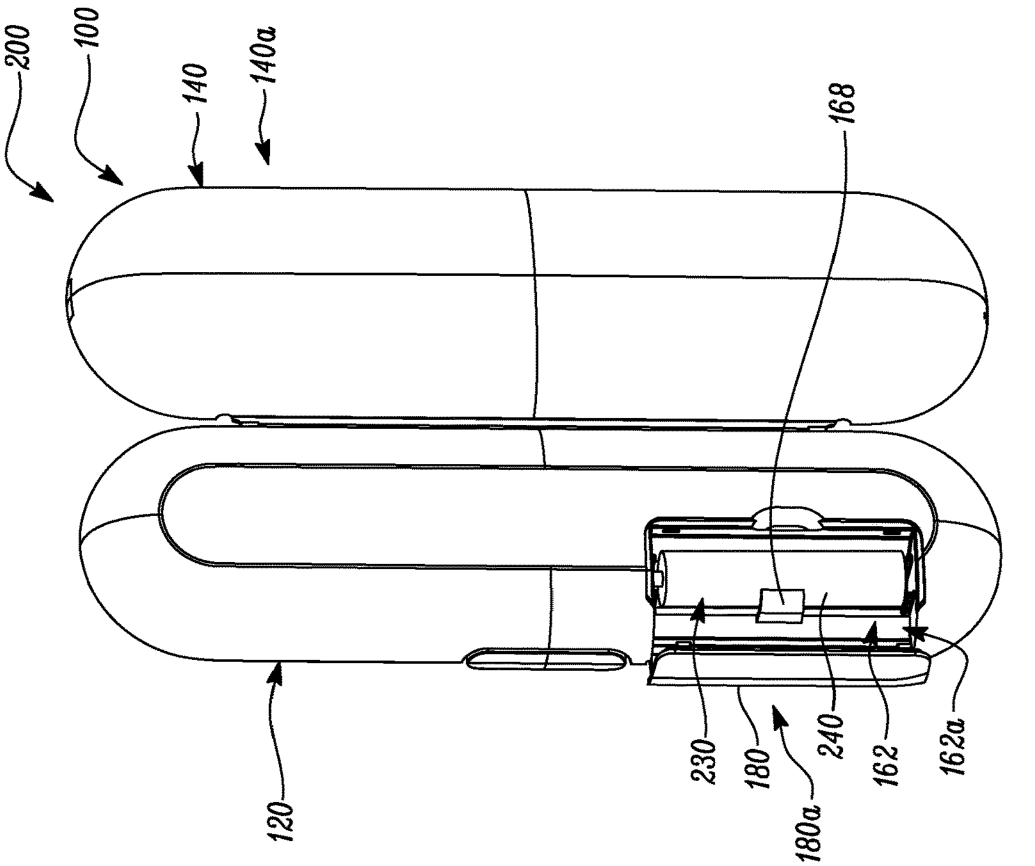
FIG. 9B shows a schematic rear perspective view of the personal care kit of FIG. 9A.
Figure 9A:
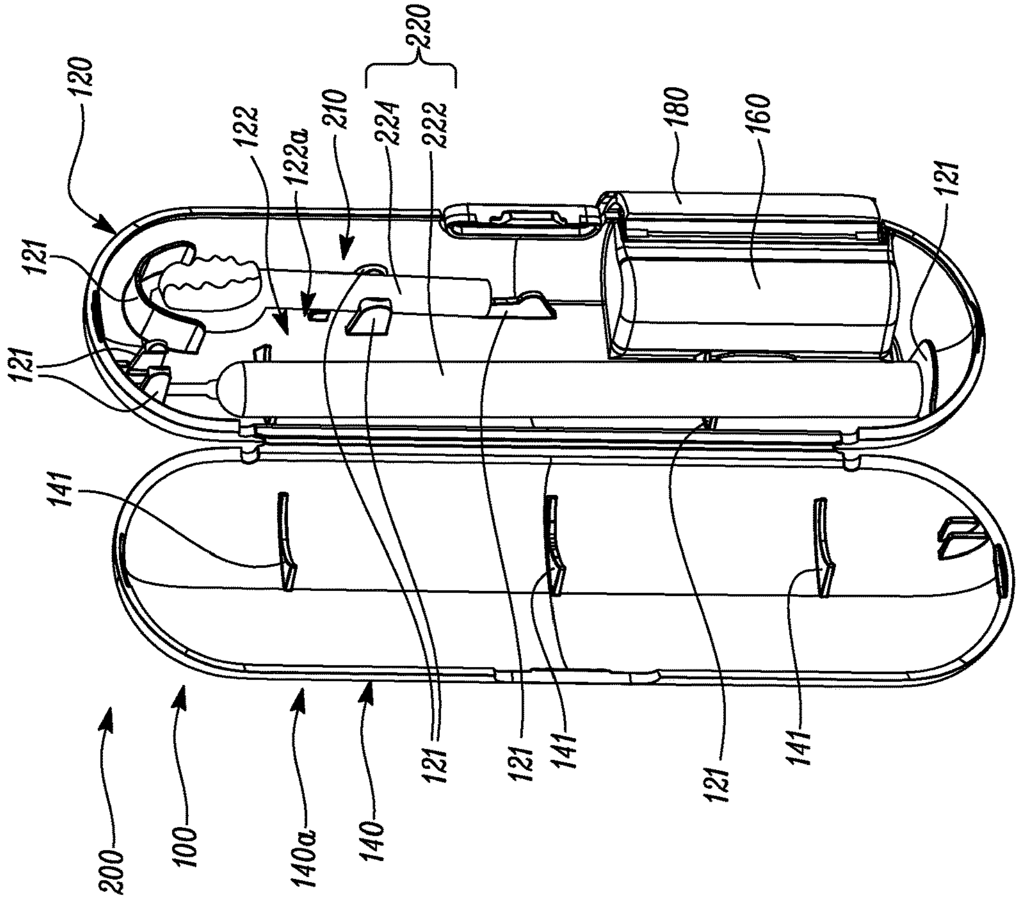
FIG. 9A shows a schematic front perspective view of a personal care kit according to the present disclosure.

FIGS. 9A and 9B show a schematic front perspective view and a schematic rear perspective view, respectively, of a personal care kit 200. The personal care kit 200 comprises the storage case 100. The primary compartment 122 is in the open position 122*a* and the primary cover 140 is in the open cover position 140*a* in FIGS. 9A and 9B. Further, the secondary compartment 162 is in the open position 162*a* and the secondary cover 180 is in the open cover position 180*a* in FIGS. 9A and 9B.

The personal care kit 200 further comprises a power-driven personal care implement 210. The power-driven personal care implement 210 is removably stored in the primary compartment 122. The personal care kit 200 further comprises a power source 230 removably stored within the secondary compartment 162.

The power-driven personal care implement 210 may be any implement that requires power to operate, such as a power-driven oral care implement, e.g. a toothbrush, a power-driven razor, a power-driven epilator, and the like. The power-driven personal care implement 210 may receive power from any suitable power source, such as the power source 230. In other words, the power source 230 may be configured to be electrically connected to the power-driven personal care implement 210 for supplying power to the power-driven personal care implement 210 after being removed from the secondary compartment 162.

In some examples, the power-driven personal care implement 210 is a battery-driven implement. Accordingly, in some examples, the power source 230 is at least one battery 240. The at least one battery 240 may be any suitable battery, such as a double-A battery (AA), a triple-A battery (AAA), a 9-volt battery, a rechargeable battery, and the like. In some examples, the at least one battery 240 comprises a plurality of batteries 240.

The power-driven personal care implement 210 is preferably a power-driven oral care implement 220, and more preferably a power-driven toothbrush. Specifically, the power-driven oral care implement 220 illustrated in FIG. 9A is the power-driven toothbrush. The power-driven oral care implement 220 illustrated in FIG. 9A comprises a handle 222 and a head 224. The head 224 is repeatedly attachable to and detachable from the handle 222. However, in some other examples, the head 224 may be permanently connected to the handle 222. In some examples, the head 224 and the handle 222 may be integrally formed as a unitary component. The handle 222 may be grasped by the user during use of the power-driven oral care implement 220, and the head 224 comprises a plurality of filaments for providing oral care, such as brushing of teeth.

As illustrated in FIG. 9A, the plurality of primary cavity retention features 121 removably secure and restrict movement of the power-driven personal care implement 210 when stored in the primary compartment 122. Specifically, the plurality of primary cavity retention features 121 removably secure and restrict movement of the handle 222 and the head 224 of the power-driven oral care implement 220, as illustrated in FIG. 9A. Moreover, the one or more retaining members 168 removably secure the power source 230 within the secondary compartment 162. Specifically, the one or more retaining members 168 removably secure the at least one battery 240 within the secondary compartment 162, as illustrated in FIG. 9B.

Figure 10B:
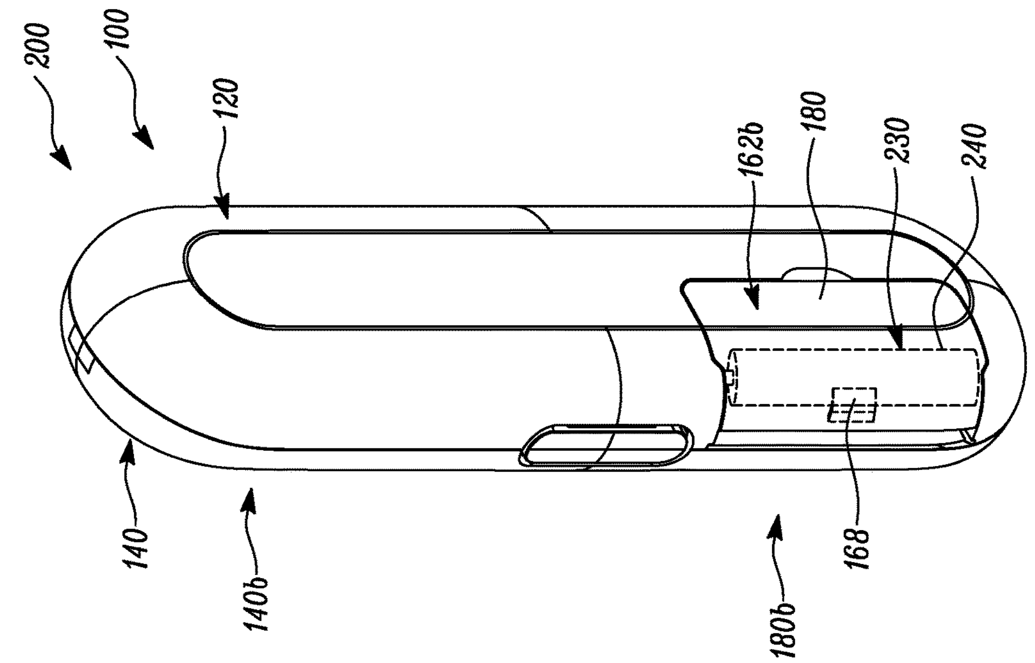
FIG. 10B shows a schematic rear perspective view of the personal care kit of FIG. 10A.
Figure 10A:
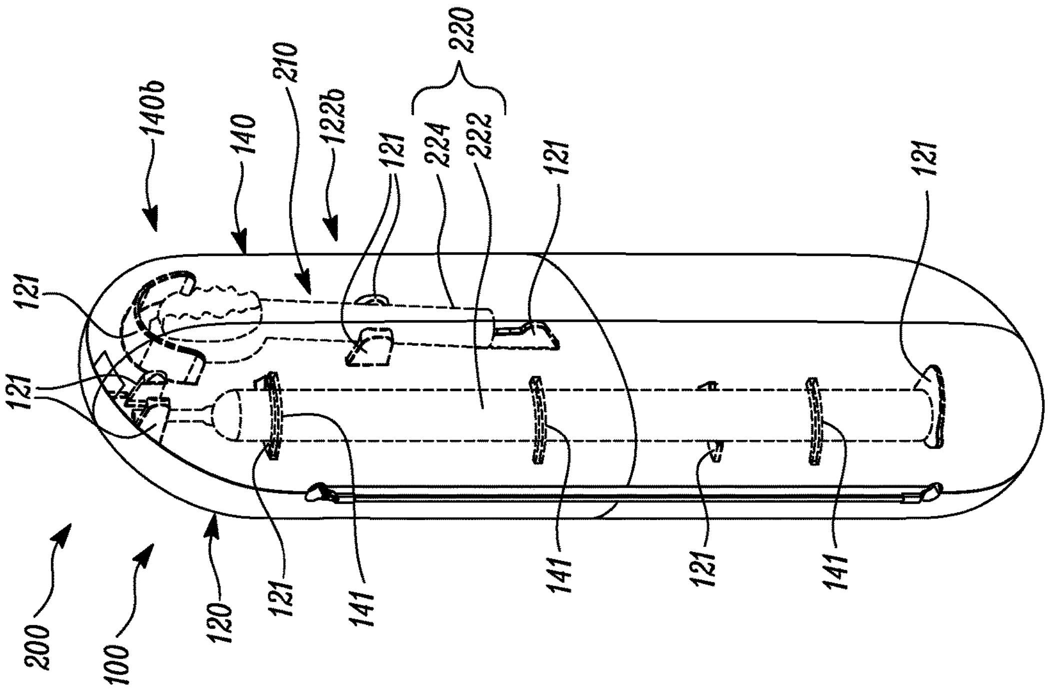
FIG. 10A shows a schematic front perspective view of the personal care kit of FIG. 9A with the storage case in another configuration.

FIGS. 10A and 10B show a schematic front perspective view and a schematic rear perspective view, respectively, of the personal care kit 200. The primary compartment 122 is in the closed position 122*b* in FIGS. 10A and 10B. The primary cover 140 is in the closed cover position 140*b* in FIGS. 10A and 10B. Further, the secondary compartment 162 is in the closed position 162*b*. The secondary cover 180 is in the closed cover position 180*b* in FIGS. 10A and 10B. Some hidden parts of the storage case 100 are shown by dashed lines for illustrative purposes. Further, the power-driven personal care implement 210 and the power source 230 are shown by dashed lines.

In some examples, the primary cavity 120 and the primary cover 140 define a maximum thickness of the storage case 100 in the closed cover position 140*b*. In one example, the maximum thickness of the storage case 100 may be about 26 mm. Furthermore, in some examples, the primary cavity 120 and the primary cover 140 may have respective maximum thicknesses of about 13 mm.

Moreover, the plurality of primary cover retention features 141 may complement the plurality of primary cavity retention features 121 in removable securement of the power-driven oral care implement 220 in the primary compartment 122 when the primary cover 140 is in the closed cover position 140*b* and the primary compartment 122 is in the closed position 122*b*. In some examples, the primary cover retention features 141 may help in removably securing the handle 222 within the primary compartment 122.

The storage case 100 may be used to store the power-driven personal care implement 210 and the power source 230. As such, the power source 230 may not have to be carried separately from the storage case 100. Therefore, the storage case 100 may be suitable for being carried by the user during travel.

The storage case 100 may be used to store the power-driven personal care implement 210 in the primary compartment 122 and the power source 230 in the secondary compartment 162. As discussed above, the secondary compartment 162 may be separated from the primary compartment 122 in a substantially watertight manner. Further, the secondary compartment 162 may be configured to store the power source 230 electrically unconnected to any electrical conductors. Consequently, the storage case 100 may electrically isolate the power source 230 from the power-driven personal care implement 210. Therefore, the power source 230 may not get discharged when stored in the storage case 100.

Further, when stored in the secondary compartment 162, the power source 230 may not pose an electrical hazard due to potential contact with electrically conductive contaminants, such as water and toothpaste, that may be present in the primary compartment 122. Specifically, the secondary cavity 160 may prevent entry of such contaminants into the secondary compartment 162 from the primary compartment 122.

Moreover, since the primary cover 140 and the secondary cover 180 are movably connected to the primary cavity 120 and the secondary cavity 160, respectively, at opposing sides (i.e., proximal to the first and second side walls 126*a*, 126*b*, respectively) of the storage case 100, and further open from front and back sides (i.e., from the front open side 123 and the back wall 127, respectively) of the storage case 100, any accidental entry of contaminants from the primary compartment 122 to the secondary compartment 162 may be prevented when the primary compartment 122 and the secondary compartment 162 are open at the same time.

In the context of this disclosure, the term "substantially" refers to an arrangement of elements or features that, while in theory would be expected to exhibit exact correspondence or behavior, may, in practice embody something slightly less than exact. As such, the term denotes the degree by which a quantitative value, measurement or other related representation may vary from a stated reference without resulting in a change in the basic function of the subject matter at issue.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A storage case (100) for storing a power-driven personal care implement (210), the storage case (100) comprising:

a primary cavity (120) comprising a first side wall (126*a*) and a second side wall (126*b*) disposed opposite to the first side wall (126*a*);

a primary cover (140), movably connected to the primary cavity (120), the primary cavity (120) and the primary cover (140) defining a primary compartment (122) configured to store the power-driven personal care implement (210) therein, the primary cover (140) being configured to set the primary compartment (122) in an open position (122*a*) or a closed position (122*b*);

a secondary cavity (160) extending at least partially into the primary compartment (122), comprising an edge wall (166) disposed distal to the first side wall (126*a*) and proximal to the second side wall (126*b*); and a secondary cover (180), movably connected to the secondary cavity (160), the secondary cavity (160) and the secondary cover (180) defining a secondary compartment (162) separate from the primary compartment (122), the secondary cover (180) being configured to set the secondary compartment (162) in an open position (162*a*) or a closed position (162*b*);

wherein the primary cover (140) is movably coupled to the primary cavity (120) at the first side wall (126*a*), and wherein the secondary cover (180) is movably coupled to the secondary cavity (160) at the edge wall (166), wherein the secondary compartment (162) is configured to store a power source (230) electrically unconnected to any electrical conductors.

2. The storage case (100) of claim 1, wherein the secondary cavity 160 is sealed from the primary cavity (120) in order to prevent flow of liquid from the primary compartment 122 to the secondary compartment 162.

3. The storage case (100) of claim 1, wherein the primary cavity (120) and the primary cover (140) in closed position define a maximum thickness of the storage case (100), the maximum thickness of the storage case (100) being between 20 mm and 40 mm.

4. The storage case (100) of claim 3, wherein the maximum thickness of the storage case (100) is between 25 mm and 30 mm.

5. The storage case (100) of claim 1, wherein the primary cavity (120) comprises an open front side (123) and a back wall (127) disposed opposite to the open front side (123), wherein the primary cover (140) covers the open front side (123) in the closed position (122*b*), and wherein the secondary cover (180) is disposed adjacent to the back wall (127) in the closed position (162*b*).

6. The storage case (100) of claim 1, wherein the secondary cavity (160) further comprises a main wall (164) and one or more retaining members (168) extending from the main wall (164), and wherein the one or more retaining members (168) are configured to removably secure the power source (230) within the secondary compartment (162).

7. The storage case (100) of claim 1, further comprising:

a primary hinge joint (125) pivotally connecting the primary cover (140) to the primary cavity (120) and/or a secondary hinge joint (165) pivotally connecting the secondary cover (180) to the secondary cavity (160).

8. The storage case (100) of claim 7, wherein the primary hinge joint (125) comprises a flexural hinge (135), and the secondary hinge joint (165) comprises a flexural hinge (175).

9. The storage case (100) of claim 1, further comprising:

a primary latch mechanism (195) configured to releasably secure the primary cover (140) to the primary cavity (120) and/or a secondary latch mechanism (190) configured to releasably secure the secondary cover (180) to the secondary cavity (160).

10. The storage case (100) of claim 1, wherein the primary cavity (120), the primary cover (140), the secondary cavity (160), and the secondary cover (180) are integrally formed as one unitary component.

11. The storage case (100) of claim 10, wherein the primary cavity (120), the primary cover (140), the secondary cavity (160), and the secondary cover (180) are integrally unitarily molded in one molding step.

12. The storage case (100) of claim 1, wherein the storage case (100) is made from a material selected from the following list: polypropylene, polyethylene, ethylene-vinyl acetate, polyamide, acrylonitrile butadiene styrene, polyoxymethylene, acrylonitrile styrene acrylate, and any combinations thereof.

13. The storage case (100) of claim 1, wherein the storage case (100) is unitarily made from polypropylene.

14. The storage case (100) of claim 1, wherein the primary compartment (162) has a maximum length extension (L1) extending along a longitudinal axis (134) of the primary compartment (122) and a maximum width extension (W1) extending perpendicular to the longitudinal axis (134) of the primary compartment (122), wherein the secondary compartment (162) has a maximum length extension (L2) extending along a longitudinal axis (174) of the secondary compartment (162) and a maximum width extension (W2) extending perpendicular to the longitudinal axis (L2) of the secondary compartment (162), and wherein:

the maximum length extension (L1) of the primary compartment (122) is greater than the maximum length extension (L2) of the secondary compartment (162) by a factor of at least two and/or the maximum width extension (W1) of the primary compartment (122) is greater than the maximum width extension (W2) of the secondary compartment (162) by a factor of at least two.

15. A personal care kit (200) comprising the storage case (100) of claim 1 and a power-driven personal care implement (210).

16. The personal care kit (200) of claim 15, wherein the power-driven personal care implement (210) comprises a power-driven oral care implement (220).

17. The personal care kit (200) of claim 16, wherein the power-driven personal care implement (220) comprises a toothbrush having a handle (222) and a head (224), the head (224) being repeatedly attachable to and detachable from the handle (222).

18. The personal care kit (200) of claim 15, further comprising a power source (230) removably stored within the secondary compartment (162), wherein the power source (230) comprises at least one battery (240).

* * * * *